(12) United States Patent
Hagemeyer et al.

(10) Patent No.: US 7,892,590 B2
(45) Date of Patent: Feb. 22, 2011

(54) EXTENDED SHELF LIFE AND BULK TRANSPORT OF PERISHABLE ORGANIC LIQUIDS WITH LOW PRESSURE CARBON DIOXIDE

(75) Inventors: Richard Hagemeyer, Nashville, TN (US); Joseph H. Hotchkiss, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1464 days.

(21) Appl. No.: 11/134,831

(22) Filed: May 20, 2005

(65) Prior Publication Data

US 2005/0260309 A1   Nov. 24, 2005

Related U.S. Application Data

(60) Provisional application No. 60/573,072, filed on May 21, 2004.

(51) Int. Cl.
*A23K 1/00* (2006.01)
(52) U.S. Cl. ....................................... 426/580; 426/474
(58) Field of Classification Search ................. 426/580, 426/474
See application file for complete search history.

(56) References Cited

U.S. PATENT DOCUMENTS

| | | | | |
|---|---|---|---|---|
| 1,403,223 A | * | 1/1922 | Arnoldi | 426/397 |
| 1,418,457 A | * | 6/1922 | Owen | 426/475 |
| 1,538,369 A | * | 5/1925 | Akiyama | 426/319 |
| 1,564,809 A | * | 12/1925 | Amend | 220/592.12 |
| 2,394,303 A | * | 2/1946 | Griesbeck | 426/393 |
| 2,563,390 A | * | 8/1951 | Brendel et al. | 261/112.1 |
| 2,752,137 A | * | 6/1956 | Brendel et al. | 261/112.1 |
| 4,292,994 A | * | 10/1981 | Johnson et al. | 137/351 |
| 5,258,285 A | * | 11/1993 | Aegidius | 435/8 |
| 6,098,672 A | * | 8/2000 | Kiholm | 141/1 |
| 6,189,723 B1 | * | 2/2001 | Davis et al. | 220/586 |
| 2002/0114872 A1 | * | 8/2002 | Kaplan | 426/580 |

FOREIGN PATENT DOCUMENTS

WO   WO 89/02221   *   3/1989

OTHER PUBLICATIONS

Abstract of The Effect of Microorganisms in Molasses on Its Fermentability During Citric Acid Fermentation. Author: L. Seichert. Folia Microbiologica. vol. 7, No. 1. Feb. 1962. http://www.springerlink.com/content/415n410307088413/.*
Yau et al. 1989. Journal of Dairy Science. 72: 367-377.*
Ma et al. Journal of Dairy Science. 86: 1616-1631. 2003.*
Bulk Transporter. 2003. http://bulktransporter.com/mag/transportation_sevenaxle_milk_tank/.*

* cited by examiner

*Primary Examiner*—Anthony Weier
(74) *Attorney, Agent, or Firm*—Miller & Martin

(57) ABSTRACT

Carbon dioxide is dissolved in perishable liquids loaded into pressure vessels that are provided with low carbon dioxide head pressure so as to improve product shelf life, thereby providing options for more economical shipment, as by rail and ocean vessels and for extended transport by truck and to facilitate extended storage of perishable products and to avoid the necessity of multiple treatments for pathogen reduction.

25 Claims, 17 Drawing Sheets

PRESENT INVENTION

FIG 10a
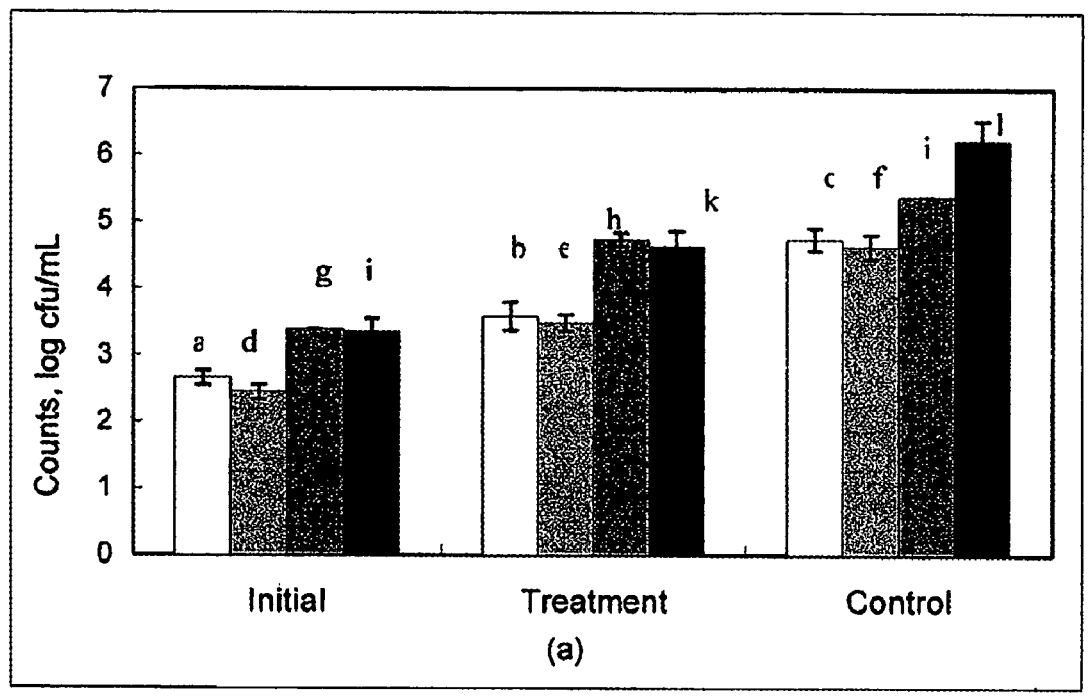
(a)
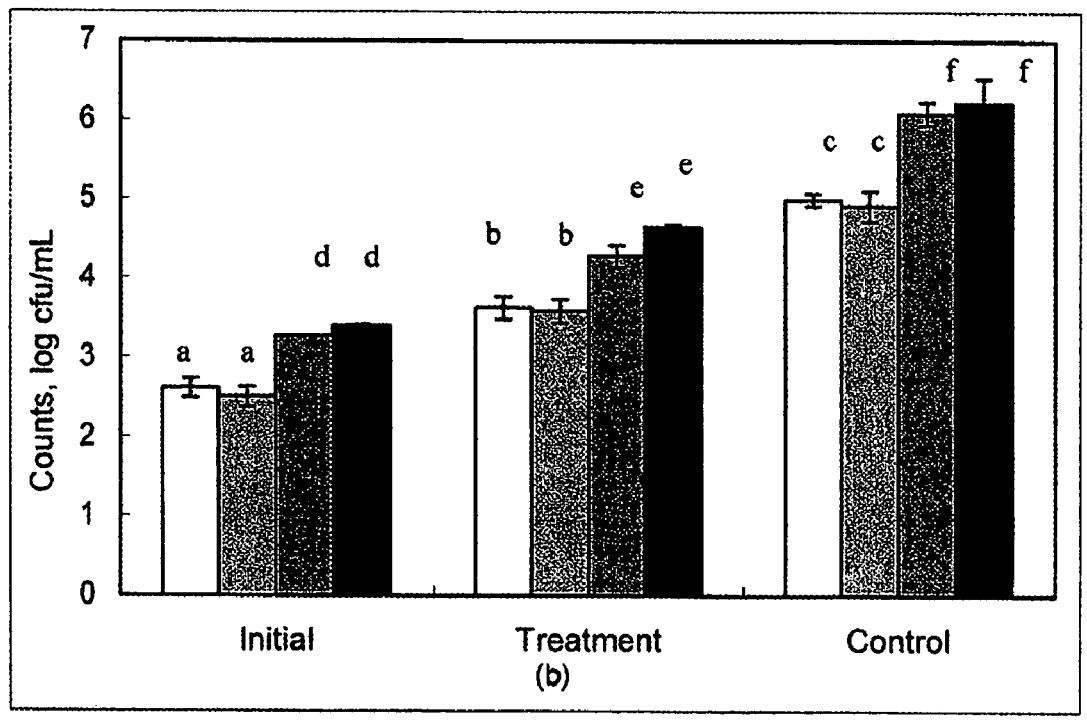
(b)
FIG 10b

FIG 10c
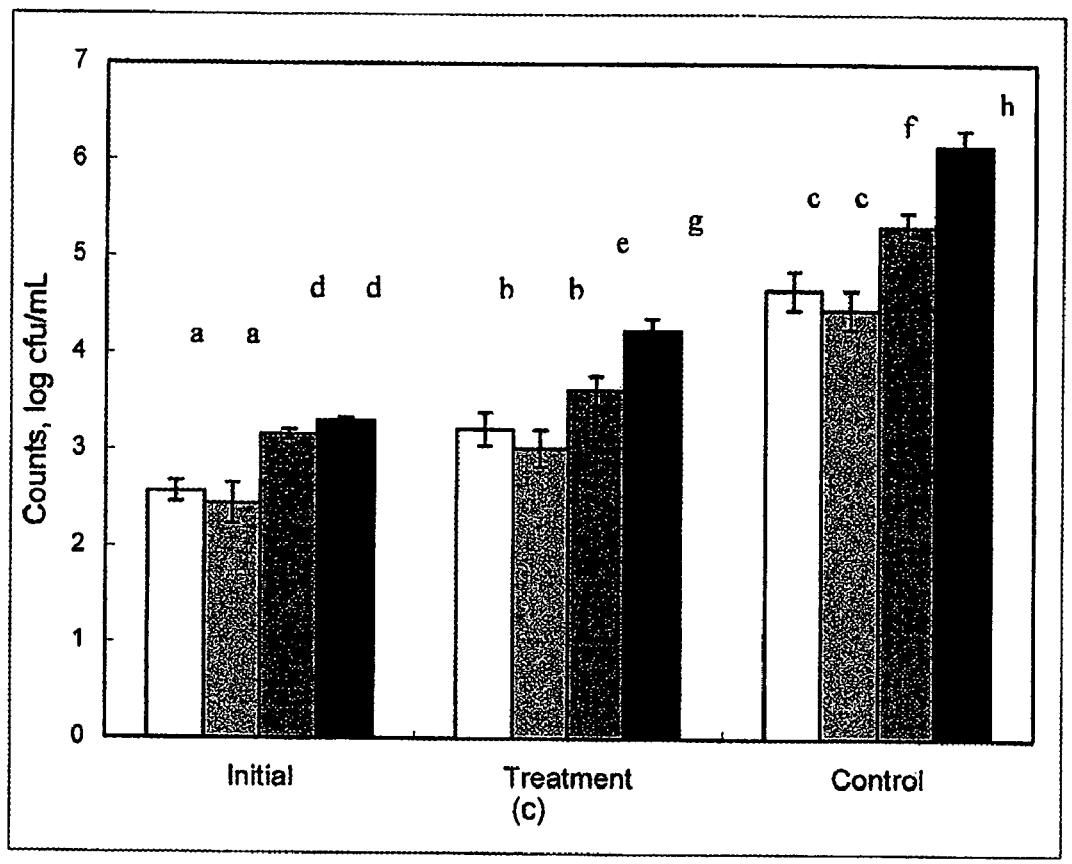
(c)
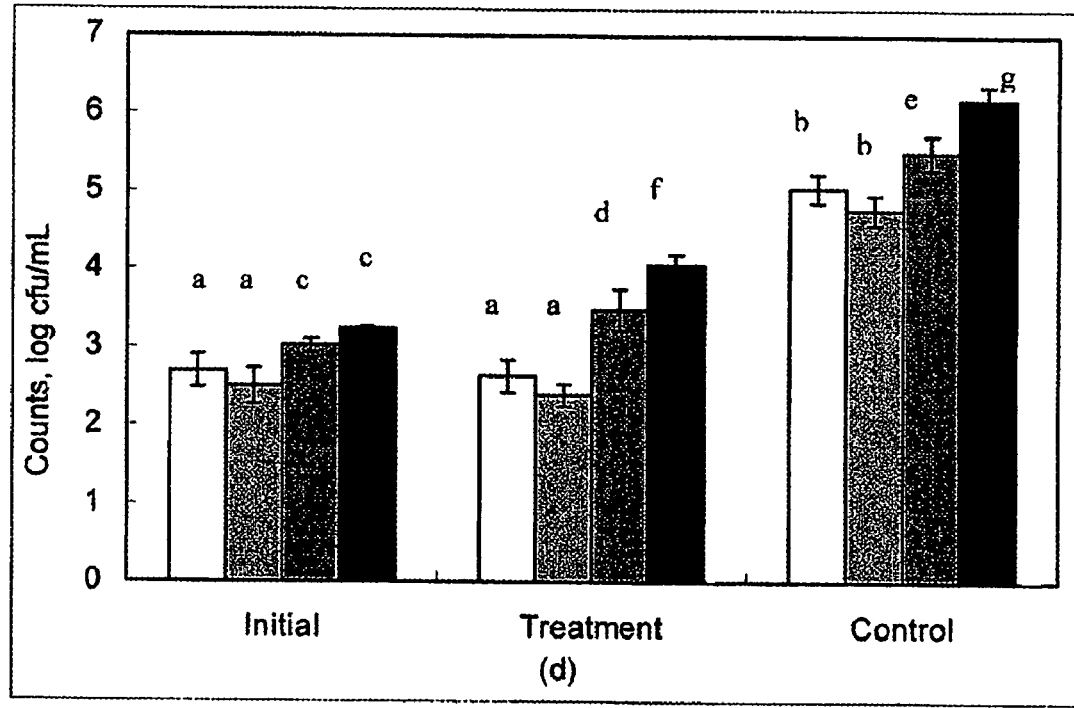
(d)
FIG 10d

Bacterial growth (SPC, log cfu/ml) in raw whole milk treated with 2000 ppm $CO_2$ or untreated, with sampling taken from the top and bottom of a storage tank. 5.0 log cfu/ml indicated as upper limit of quality.

EXTENDED SHELF LIFE AND BULK TRANSPORT OF PERISHABLE ORGANIC LIQUIDS WITH LOW PRESSURE CARBON DIOXIDE

The present application claims priority to the May 21, 2004 filing date of U.S. provisional patent application, Ser. No. 60/573,072.

FIELD OF THE INVENTION

The present invention relates to techniques to extend the shelf life and facilitate the bulk transport of perishable organic liquids whereby the liquids are mixed with carbon dioxide gas and held under carbon dioxide pressure, in order to extend the time before the liquid spoils or sustains material undesirable biological changes.

BACKGROUND OF THE INVENTION

Assuring the safety of fluid milk, related dairy products, and juices while maintaining quality and increasing the shelf life of products is a significant challenge for the food industry. Many perishable organic liquids, including juices, but especially raw milk, serve as suitable growth mediums for microorganisms. Benefits in distribution and organic liquid quality could be derived from reducing microbial growth.

The bulk transport of perishable organic liquids generally requires at least one of the following: pasteurization or similar treatments to reduce, eliminate or control pathogens; rapid shipment; and in some cases, refrigeration. Each of these options imposes additional cost and or limitations. For instance, shipment by truck may be the quickest transport time but still may not be sufficiently rapid to reach all markets. Shipment by rail or ocean cargo vessel is slower but more economical. Refrigerated shipping costs are substantially higher than the cost for shipments not requiring refrigeration. Furthermore, refrigeration is not effective to adequately restrain the growth of psychrotrophic microorganisms capable of activity at temperatures below 7° C. over sustained intervals of time. Each process of pasteurization or similar pathogen reduction treatment imposes not only expense, but may also negatively impact the flavor quality, nutritional content, and other sensory characteristics, such as color, of the treated organic liquid with a resulting negative market impact. Additionally, thermoduric microorganisms that are potential pathogens or cause spoilage may survive the pasteurization process.

As a result of these concerns, today when arranging for the shipment of fresh milk from the continental United States to Hawaii or a Caribbean island without significant dairy herds, there are two principal options, namely:

- Milk is pasteurized before bulk shipment and is re-pasteurized prior to local packaging for retail sale. The result is a flavor not as fresh as with single pasteurization and a higher cost due to multiple handling.
- Milk is pasteurized and packaged for retail sale at or near the origin and then shipped in refrigerated containers to the destination. The result is higher cost and a loss of shelf life at retail due to the transit period.

The repeated pasteurization of the first option is also particularly undesirable because while most milk borne microorganisms are neutralized by pasteurization, their lipolytic and proteolytic enzymes can survive and result in undesirable lipolysis and proteolysis.

The major strategy to extend shelf life of unpasteurized perishable organic liquids has been to provide rapid refrigeration. For instance, decreasing the storage temperature from 6° C. to 2° C. increases the time for the psychrotrophic count to reach $10^6$ cfu (colony forming units)/ml from 2.9 to 5 days (Griffith, 1987).

Several authors have reported on the use of unpressurized carbon dioxide as an anti-microbial agent in foods including dairy products. The concept of using $CO_2$ to inhibit the growth of unwanted microorganisms in dairy products stems from the technology of modified atmosphere packaging. This method of shelf life extension has been adapted to fluid dairy products by directly injecting the inert gas ($CO_2$) thereby enhancing its inhibitory effect. The direct post-pasteurization addition of carbon dioxide (DAC) to neutral and acidic pH products can be used to control contaminating organisms. DAC is widely used by cottage cheese processors in North America. Carbon dioxide has also been shown to extend the shelf life of yogurt, to improve the keeping quality of raw milk, and to extend the yields of cheese subsequently prepared from such milk. However, under specific combinations of pressure and temperature, $CO_2$ effectively precipitates the proteins from milk. For example, at 38° C. and pressures above 5514 kilopascals (kPa), or about 800 psi, complete precipitation of the casein proteins that give milk its distinctive white color results. $CO_2$ pressure treatments applied at a pressure of only 294 kPa (about 43 psi) at 20° C. may result in casein aggregation. Accordingly, pressurization has been avoided due to potential deleterious effects upon the treated liquids. In addition, and not unrelatedly, there is an absence of suitable pressure vessels for pressurized bulk storage and transport of organic liquids. The studies utilizing $CO_2$ pressure treatments have been principally directed to pathogen reduction treatments with high $CO_2$ pressures as an alternative to thermal pasteurization. Lower $CO_2$ pressures have not been previously utilized as conditions of storage and transportation to reduce microbial growth.

SUMMARY OF THE INVENTION

The present invention provides a method that extends the stability of raw milk and other perishable organic liquids sufficiently to permit their transport by rail or cargo ship, or by truck for greater distances than is ordinarily accomplished today; or shipment by any mode that would benefit the end user by being more cost effective or offering more time to handle or package the product for human consumption or for other food, feed grade, pharmaceutical, or industrial use or extended storage. In furtherance of the invention, raw milk or other perishable organic liquids are preferably cooled to the greatest extent practical and injected with carbon dioxide as they are loaded in food grade storage and transport containers that are pressure vessels according to applicable pressure vessel codes, so that the filled containers can be pressurized with about 20 to 50 psi (138 to 345 kPa), and more preferably about 30 to 50 psi (207 to 345 kPa), of carbon dioxide. Such carbon dioxide head pressure does not result in protein precipitation and maintains concentrations of sufficient parts per million in the raw milk or other organic liquids so as to suppress pathogen growth, at least of the most common obligate aerobic varieties, by lowering the ph and by initiating deleterious intercellular activity and by surrounding the pathogens in what is equivalent to their own output. In such a state, the pathogens' animation and reproduction ceases or is suitably reduced so as to inhibit their growth and multiplication, which would otherwise result in spoiled product.

The pressurized carbon dioxide rich raw milk and other perishable organic liquids may then be shipped or stored in the container without spoilage for periods of time greater than untreated and un-pressurized products, provided the storage tanks are sufficiently insulated or refrigerated to prevent excessive heating of the contents. Upon delivery, or when the milk or other organic liquid is needed for production, the container is unloaded and the carbon dioxide is released from the liquid by some form of agitation, stirring or mixing independent of or in conjunction with negative (vacuum) pressure and the liquid is then processed in its usual fashion.

The present process can effectively extend the life of a wide variety of perishable organic liquids including dairy products, vegetable juices, fruit juices, plant extracts, fungal extracts, flavoring agents, and combinations thereof.

BRIEF DESCRIPTION OF THE DRAWINGS

FIG. 3b is a side plan view of the tank container of FIG. 3a.

FIG. 3c is an end plan view of the tank container of FIG. 3a.

FIG. 3d is a detail drawing of the pressure relief valve of the tank container of FIG. 3a;

FIG. 3e is a detail drawing of the air inlet used to pressurize the tank container of FIG. 3a;

FIG. 3f is a detail drawing of the loading/discharge valve of the tank container of FIG. 3a;

DETAILED DESCRIPTION OF THE INVENTION

Figure 1:
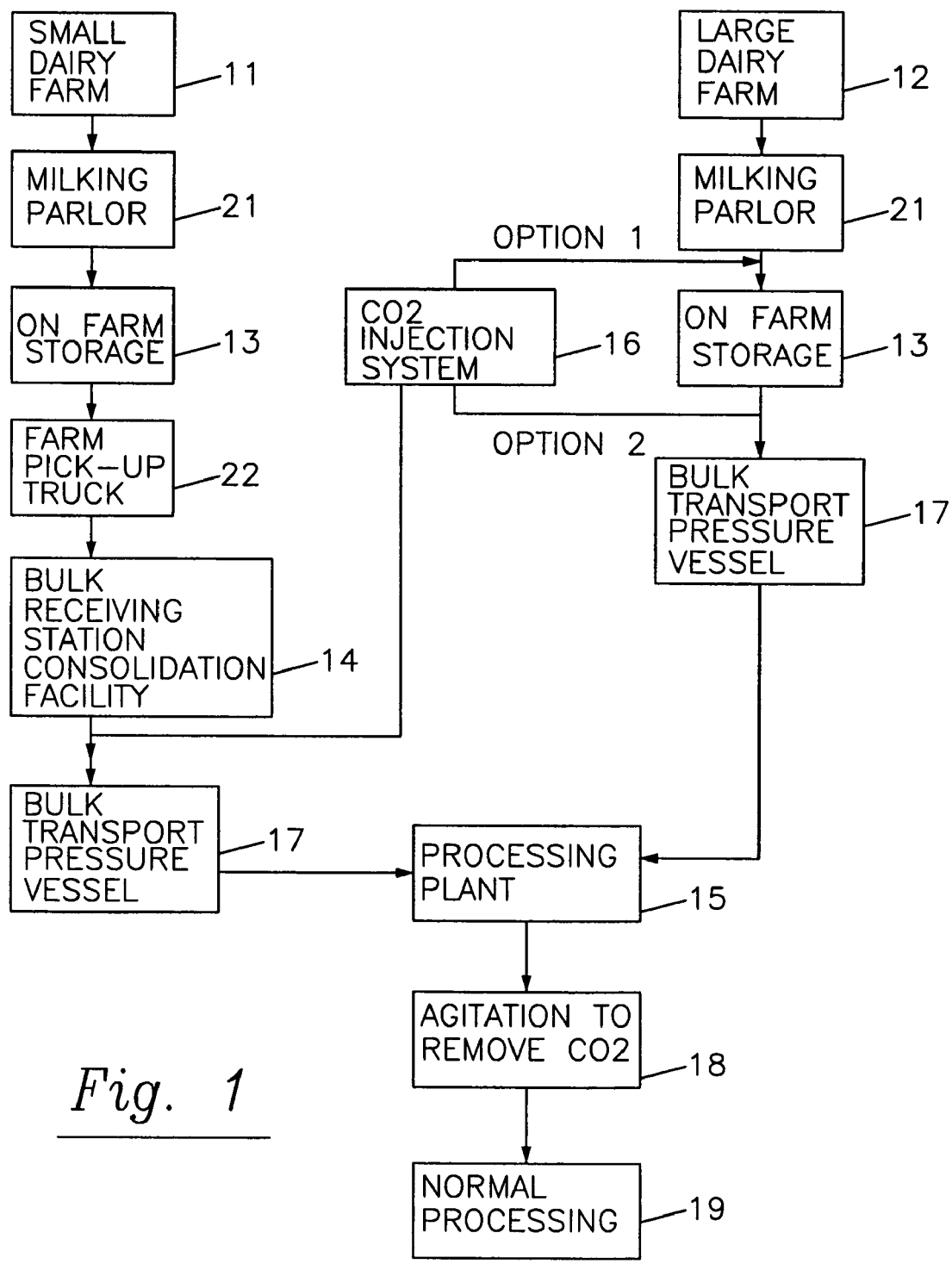
FIG. 1 is a schematic illustration of milk collection from dairy farms to processing facilities as commonly practiced in the United States, showing the integration of a new carbon dioxide injection system according to the present invention.

As is described in this patent, milk injected with carbon dioxide and the application of pressurized carbon dioxide in a transport vessel retards the growth of pathogens in the raw milk. Raw milk has been used as an example in this text not to limit the usefulness of the patent but rather to explain the invention with reference to one of the more commonly transported liquid products that is also one of the more perishable products. The same process may be utilized to retard the growth of similar pathogens in other perishable organic liquids. Accordingly, the invention may also be practiced in connection with liquids such as fruit juices, wine, malt beverages, beverage preparations, liquid eggs, feed grade bulk liquids as well as pharmaceutical or industrial grade liquids and other similar materials susceptible to detrimental microbiological activity.

For example, the present invention is applicable to any liquid dairy product, including, but not limited to, cream, light cream, light whipping cream, heavy cream, heavy whipping cream, whipped cream, whipped light cream, sour cream, acidified sour cream, cultured sour cream, half-and-half, sour half-and-half, acidified sour half-and-half, cultured sour half-and-half, reconstituted or recombined milk and milk products, concentrated milk, concentrated milk products, reverse osmosis (RO) milk, ultra filtered (UF) milk, fractionated milk, whole milk, reduced fat or low fat content milk (e.g., 1% fat milk, 2% fat milk, etc.), nonfat (skim) milk, evaporated and condensed forms of whole milk, eggnog, buttermilk, cultured milk, cultured reduced fat or lowfat milk, cultured nonfat (skim) milk, yogurt, lowfat yogurt, nonfat yogurt, acidified milk, acidified reduced fat or lowfat milk, acidified nonfat (skim) milk, low-sodium milk, low-sodium reduced fat or lowfat milk, low-sodium nonfat (skim) milk, lactose-reduced milk, lactose-reduced reduced fat or lowfat milk, lactose-reduced nonfat (skim) milk, reduced fat or lowfat milk or nonfat (skim) milk with added safe and suitable microbial organisms and any other milk product made by the addition or subtraction of milkfat or addition of safe and suitable optional ingredients for protein, vitamin, or mineral fortification of milk products defined by governmental regulation.

The present invention is also applicable to other products derived from dairy ingredients, including whey and whey products, caseinates, lactalbumin, cottage cheese, ice cream mix, ice milk mix, yogurt mix, shake mixes, batter mixes, and other dairy mixes, probiotic dairy products, including milk treated with *Lactobacillus* cultures or *Acidophilus* cultures, flavored milks, spreads, dips, sauces, eggnogs, flavored creamers, boiled custards, puddings, cheesecakes, milkshakes, smoothies, dairy shakes, and other shakes, as well as other products containing milk or other ingredients derived from dairy products.

The present invention is applicable to milk and milk-like products derived from crop plants or grains, including but not limited to, soy, rice, wheat, corn, and oats.

The present invention is applicable to avian eggs, including both in-shell and liquid preparations. The present invention is also applicable to products containing added nutritional components, e.g., protein, minerals, vitamins, fat, fiber, sugars, salts, starches, amino acids, and alcohols.

The present invention is further applicable to milk and products derived from the milk of bovine species, goats and sheep.

The present invention is also applicable to water, carbonated water, and products containing water, as well as a variety of beverages and drinks. The present invention is also applicable to fermented foods, food products, and beverages.

The present invention is also applicable to juices, extracts, liquid supplements, and liquid pharmaceuticals derived from fresh, dried, frozen or canned plants, vegetables, fruits, grasses, yeasts, fungi, and combinations thereof, including but not limited to juices or extracts derived from apples, apricots, pineapples, peaches, bananas, oranges, lemons, limes, grapefruit, plums, cherries, grapes, raisins, prunes, nectarines, kiwi, star fruit, papayas, mangos, blueberries, raspberries, strawberries, choke cherries, boysenberries, cranberries, lingenberries, pomegranates, melons, tomatoes, carrots, onions, garlic, celery, lettuce, cucumbers, radishes, broccoli, potatoes, sweet potatoes, yams, cauliflower, brussel sprouts, cabbage, rutabaga, corn, peas, green beans, yeast, including brewer's yeast, and mushrooms. The present invention also is applicable to blended, liquefied whole plants, fruits, vegetables, grasses, yeasts, fungi, and combinations thereof, including but not limited to the whole plants, fruits, vegetables, grasses, yeasts, fungi disclosed hereinabove.

The present invention may be applicable to a mixture of a liquid dairy product, e.g., skim milk, and one or more juices, extracts, liquid supplements, and liquid pharmaceuticals.

The amount of vegetable, fruit, yeast, or fungal juice, or combination thereof, in the product can be between 0.05% to 100%, preferably between 0.1% to 75%.

The present invention may further be applicable to products containing any added flavoring agent, including any of the usual flavors, such as a fruit flavor (natural or artificial, or both), vegetable flavor, chocolate flavor, vanilla flavor, and any of the usual soft drink flavors, such as the cola flavor, ginger ale flavor, etc., or a traditional malt flavor.

The term "shelf life" is defined as the amount of time a product remains acceptable for organoleptic, nutritional, and/or safety purposes, for the consumer or the retailer.

The term "undesirable biological changes" includes changes in the liquid or product such that the liquid or product is unacceptable for organoleptic, nutritional, and/or safety purposes, for the consumer. These changes may include, but are not limited to, changes in the color (brown color), decreases in the flavor quality (cooked flavor), and decreases in the nutritional content (i.e., vitamin loss or protein precipitation).

The term "liquid" is defined as being a fluid or semi-fluid, e.g., a pourable or flowable substance intended for human or animal consumption.

The terms "pathogens" and "food pathogens" are defined to include microorganisms, bacteria, viruses, and fungi, including but not limited to psychrotrophic bacteria; lipolytic psychrotrophic bacteria; proteolytic psychrotrophic bacteria; mesophylic bacteria; *Bacillus* species, including *B. cereus*; *Clostridium* species, including *C. perfringens* and *C. botulinum*; *Cryptosporidium* species; *Campylobacteria* species, including *C. jejuni*; *Listeria* species, including *L. monocytogenes*; *Escherichia* species, including *E. coli* and pathogenic *E. coli* strains; *Mycobacterium* species, including *M. paratuberculosis*; *Pseudomonas* species, including *P. fluorescens*; *Helicobacteria* species; *Yersinia* species, including *Y. entercolitica*; *Arcobacter* species; *Aeromonas* species; *Toxoplasma* species, including *T. gondii*; *Streptococcus* species; *Staphylococcus* species, including *S. aureus*; *Shigella* species; *Salmonella* species, including *S. enteritidis, S. Montevideo, S. typhimurium*; *Cyelospora* species, including *C. cayetanensis*; *Cignatera* species; *Vibrio* species; *Plesiomonas* species; *Entamoeba* species, including *E. histolytica*; Hepatitis viruses; Astroviruses; Caliciviruses; enteric Adenoviruses; Parvoviruses; and Rotaviruses.

$CO_2$ is a ubiquitous environmental bacterial stress. In accord with the present invention, purified $CO_2$ may be safely and inexpensively utilized at low pressures to improve overall quality and safety of dairy products, as well as other liquid products, juices, extracts, liquid supplements, and liquid pharmaceuticals. The combination of refrigeration below 7° C. and application of $CO_2$ pressure may result in a synergistic effect.

As previously stated, milk and dairy products are generally very rich in nutrients that provide an ideal growth environment for many microorganisms. A principal class of microorganism that may find its way into milk is bacteria. Bacterial growth generally proceeds through a series of four phases: (1) a lag phase during which time the microorganisms become accustomed to their new environment with little or no growth; (2) a log phase during which bacterial logarithmic or exponential growth begins; (3) a stationary phase where the rate of multiplication slows down due to the lack of nutrients and build up of toxins; and (4) a death phase in which bacteria numbers decrease as growth stops and existing cells die off. In addition, fungi such as yeast and molds, as well as bacterial viruses may also be present in milk and dairy products. Typically, microbial growth will vary according to a number of factors including nutrient content, moisture content, pH, available oxygen, and temperature.

The 2003 Revisions of the Grade "A" Pasteurized Milk Ordinance promulgated by the U.S. Food and Drug Administration establish chemical, physical, bacteriological and temperature standards for Grade "A" Raw Milk and Milk Products for Pasteurization, Ultra Pasteurization or Aseptic Processing. Principal among these are that milk be cooled to 10° C. (50° F.) or less within four hours or less of the commencement of the first milking and to 7° C. (45° F.) or less within two hours after the completion of milking provided that the blend temperature after the first milking and subsequent milkings does not exceed 10° C. Bacterial limitations provide that the individual producer milk is not to exceed 100,000 cfu per mL prior to commingling with other producer milk and not to exceed 300,000 mL as commingled milk prior to pasteurization. Bacterial counts are performed according to the Standard Plate Count (SPC) which determines the number of visible cfu's or colony-forming units (numbers of individual or tightly associated clumps of bacteria) in 1 mL of milk incubated at 32° C. (90° F.) for 48 hours.

Milk is an excellent food source for humans, bacteria, and microorganisms alike as it is full of vitamins, fats, minerals, nutrients, and carbohydrates. Milk is rich in the protein casein which gives milk its characteristic white color, and the most abundant carbohydrate is the disaccharide lactose "milk sugar." At room temperature, milk undergoes natural souring caused by lactic acid produced from the fermentation of lactose by fermentive lactic acid bacteria. Spoilage is a term used to describe the deterioration of a food's texture, color, odor, or flavor to the point that it is unappetizing or unsuitable for human or animal consumption. Microbial spoilage of food often involves the degradation of protein, carbohydrates, and fats by microorganisms or their enzymes.

Several authors have reported on the use of $CO_2$ as an antimicrobial agent in foods including dairy products (Dixon and Kell, 1989; Haas et al., 1989). In raw milk, bacterial growth was reduced by 50% after addition of $CO_2$ and storage at 6.7° C. for 48 h (Shipe et al., 1978). King & Mabbitt (1982) demonstrated an extension in storage life of both poor and good quality milks by the addition of 30 ppm $CO_2$. $CO_2$ is effective in reducing the rate of growth of organisms detected in aerobic plate count assays (Roberts and Torrey, 1988). Compared to control milk, the SPC of milk containing 20-30 pmm dissolved $CO_2$ was 3 $\log_{10}$ cfu/ml lower after 4 days of storage at 7° C. (Mabbitt, 1982). In the presence of $CO_2$, the time for SPC to reach 7 $\log_{10}$ cfu/ml was extended from 3 to 9 days at 7° C. and 6 to 11 days at 4° C., whereas in the control this level was reached in just 5 days at 7° C. and 8 days at 4°

C. (Hotchkiss, 1996). Coliforms and psychrotrophs were also significantly reduced compared to control milk under the same conditions (Roberts and Torrey, 1988). Generally, gram-negative psychrotrophs are more susceptible to the effects of $CO_2$, whereas gram-positive bacteria and spores are more resistant; Lactobacillus spp. are relatively $CO_2$ resistant, or their growth may be enhanced by a $CO_2$ enriched environment (Hendricks and Hotchkiss, 1997). Excessive growth of Lactobacillus spp. in raw milk may lead to spoilage or development of off-flavors due to fermentation. Treatments that reduce microbial populations may result in outgrowth of thermoduric spore-forming bacteria due to reduced competition, increasing the likelihood of post-pasteurization spoilage or reduced food safety.

The addition of $CO_2$ has been shown to increase the lag phase of growth and decrease the growth rate of microorganisms (Martin et al., 2003). In $CO_2$-treated milk, extension of the lag phase increased the generation times of the Pseudomonas species (Roberts and Torrey, 1988). Increasing concentrations of $CO_2$ increased lag phases and extended growth rates. King and Mabbitt (1982) demonstrated an extension in storage life of poor quality milk ($10^5$ cfu/ml) by 1.2 days and good quality milk ($10^3$ cfu/ml) by 3 days with the addition of 30 ppm $CO_2$. The extension of keeping quality of milk due to $CO_2$ was maximized when the initial counts in the milk were low. Low-level carbonation of bulk tank milk inhibits the increase in microbiota for 3 to 4 days. The reduction in counts would, in turn, reduce the thermotolerant lipases and proteases secreted into the milk, post-pasteurization (Espie and Madden, 1997).

Several theories explaining the mechanism of $CO_2$ action on microorganisms have been proposed. The exclusion of oxygen by replacement with $CO_2$ may contribute to the overall effect by slowing the growth rate of aerobic bacteria (Daniels et al., 1985). $CO_2$ can also readily pass through cell membranes, form carbonic acid within the cell with a resultant decrease in intracellular pH which slows intracellular enzyme activities (Wolfe, 1980). $CO_2$ has been demonstrated to be inhibitory of certain enzymes, especially decarboxylating enzymes (Gill and Tan, 1979). Carbon dioxide can also accumulate in membrane lipid bilayers, altering membrane properties and inhibiting membrane functions (Enfors and Molin, 1978). The effect of $CO_2$ has been found to be enhanced at lower temperatures (Gill and Tan, 1979). The increasing solubility of $CO_2$ at lower temperatures increased the relative inhibitory effect of $CO_2$ on P. fragi (Enfors and Molin, 1981).

These studies have all addressed the use of $CO_2$ injections or atmospheres without subjecting the treated liquid to pressure. To some extent this may be due to the paucity of food grade pressure bulk storage vessels. However, because the application of pressure to milk is known to lead to undesirable biological changes, specifically the precipitation of proteins, research has taught away from the present invention. When pressure has been applied to other perishable liquids, it has typically been at high pressures to achieve the substantial elimination of pathogens. The maintenance of milk and other bulk perishable liquids under low pressures of $CO_2$ at about 138 kPa and 350 kPa for the purposes of retarding microbial growth during storage and transport is heretofore unknown to the inventers.

While details of the carbon dioxide treatment according to the invention may be slightly varied according to the particular organic liquids involved, the invention will be explained below in connection with milk collection and processing, which may be best understood with reference to FIG. 1.

FIG. 1 illustrates the movement of raw milk from a large or small dairy farm 11,12 to a milk bottling or processing facility 15. Dairy farms vary in size from a few cows to as many as 12,000 or more. The farms milk at least twice daily in milking parlors 21 and the milk is chilled and pumped into on-farm storage tanks 13. Milk is picked up by transport tankers 22 at least every other day and in the case of large farms 12, multiple times a day. Milk from small farms 11 is often taken to consolidation facilities 14 where it is tested before commingling with other farms' milk. The process of this invention is to station carbon dioxide injection systems 16 comprising tanks of liquefied or compressed carbon dioxide with the appropriate hoses, regulators, valves, fittings, injectors and appurtenances necessary to dissolve the $CO_2$ into the milk at the farm 12 or consolidation facility 14 or in some cases the carbon dioxide system 16 may be mounted on the transport vehicle so as to be mobile and not require separate systems 16 for each point of loading.

Figure 7:
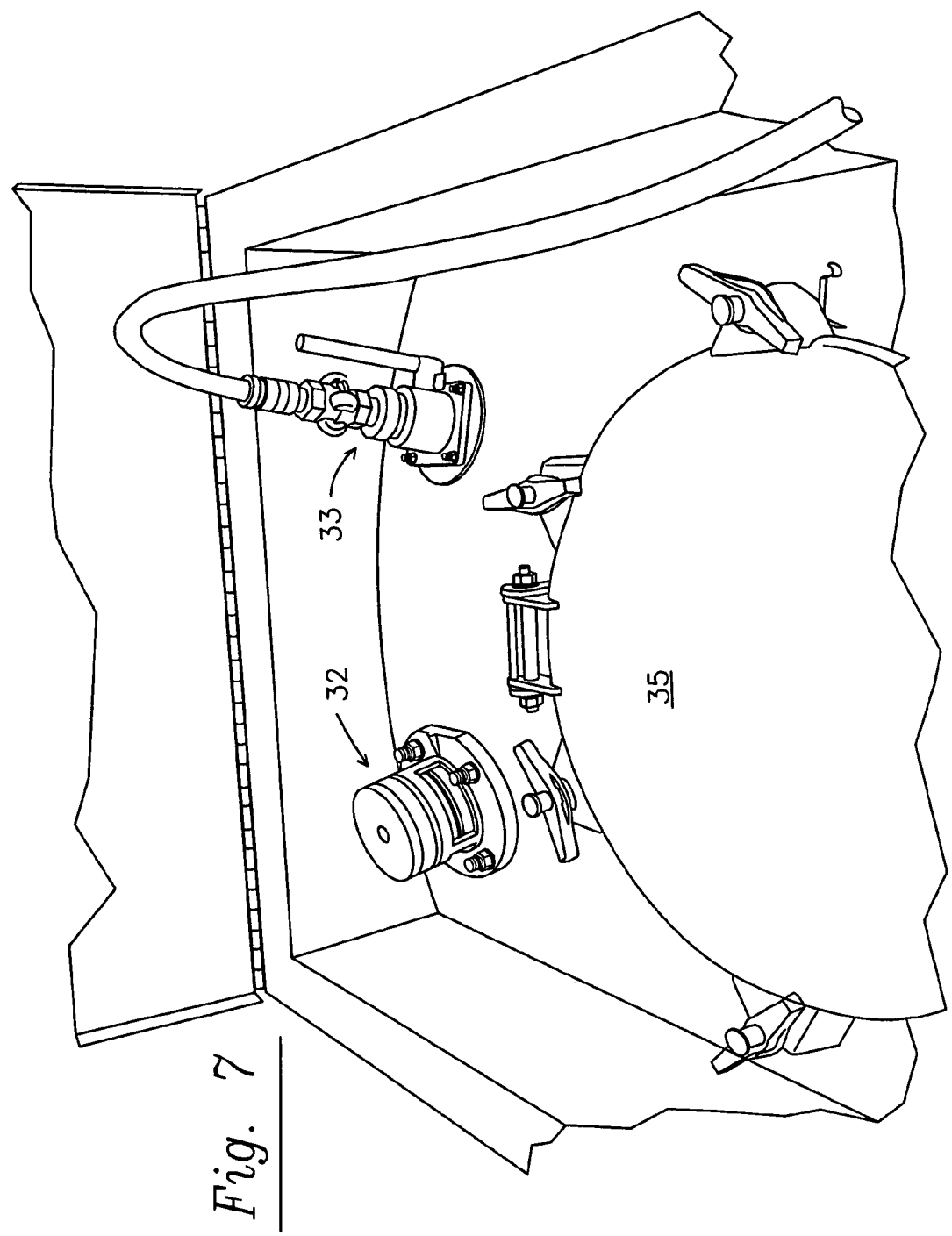
FIG. 7 illustrates carbon dioxide or air being used to pressurize the transport tank.

Once the raw milk is sufficiently infused with carbon dioxide for stabilization, the transport tank, a bulk pressure transport vessel 17 such as intermodal tank 30 shown in FIG. 3, is pressurized to preserve the appropriate concentration of dissolved $CO_2$. The tank 30 can be pressurized using the same carbon dioxide source as for the infusion by then rerouting the gas through the air inlet 33 as shown in FIG. 7. Alternatively, solid carbon dioxide, commonly referred to as "dry ice," can be inserted into the liquid through the manway 35 shown in FIG. 3, at amounts calculated to create the required pressure when vaporized in the sealed tank. This approach also has the added benefit of lowering the temperature of the product, further slowing the growth of pathogens and enhancing the effectiveness of the invention.

The loaded tank 30 is transported to a milk bottling plant or processing plant 15 where the milk is agitated 18 to remove the carbon dioxide. This may be done in-situ by air injection into the transport tank or may be done in a separate agitation tank to remove $CO_2$ to acceptable levels or this may involve the use of vacuum or negative pressure. The unloading process is otherwise essentially the same as with untreated milk except for this step.

The milk is then processed according to its end use 19 which may be to pasteurize, homogenize, process, condense, culture, or perform other customary processes before packaging for retail sale or preparing for further transport or sale. Even in the event that the milk processing plant 15 is reasonably close to the dairy farm 11,12, there may still be a need to extend the life of the raw milk. The dairy farm or purchaser of the milk may want greater flexibility in processing the milk when supply and demand are imbalanced. For instance, rather than diverting excess milk to an alternative use, such as milk powder, a lower value product, the milk processor may want to retain inventory at or near the plant 15 in times of greater supply for use later in times of greater demand. This preserves the milk for its highest and best use and eliminates unnecessary transportation cost. In the event it is desired to transport the raw milk long distances, it is necessary today to use relatively expensive express truck delivery from farm 12 or consolidation facility 14 to processing plant 15 as lower cost alternatives are typically too slow. Even with express truck delivery, it is generally impractical to transport raw milk long distances within the three days desired or stipulated by industry or regulatory agencies due to the perishable nature of milk. With the greater shelf life of raw milk stabilized according to the present invention, raw milk may be loaded at a dairy farm with a carbon dioxide mixture and sealed with pressurized carbon dioxide and the tank delivered to a rail carrier for conveyance anywhere in North America or to an ocean carrier for conveyance to much of the world.

Figure 2A:
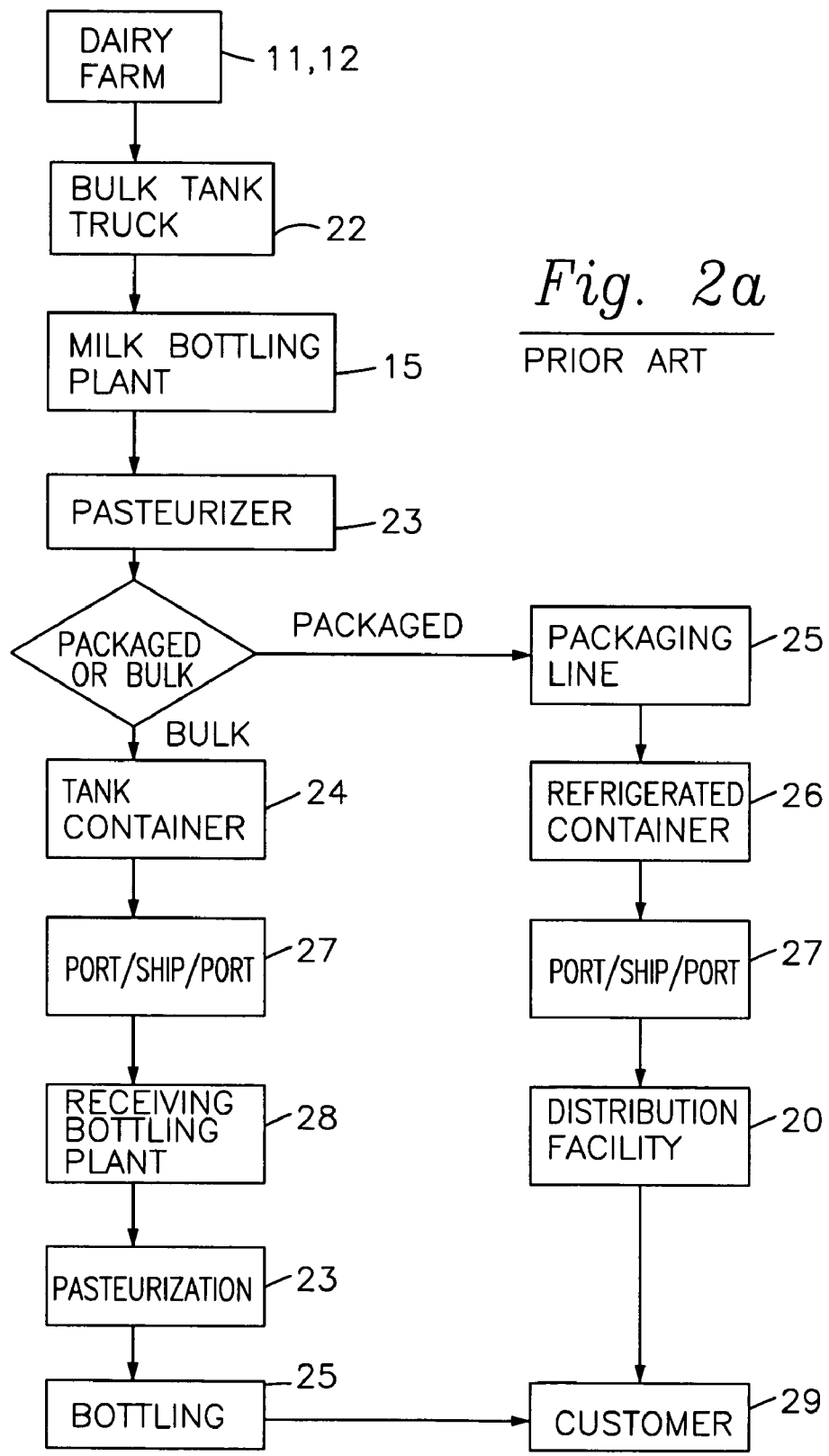
FIG. 2a is an alternative of FIG. 1, showing the prior art Hawaii Model for shipping milk for extended times and distances.
Figure 2B:
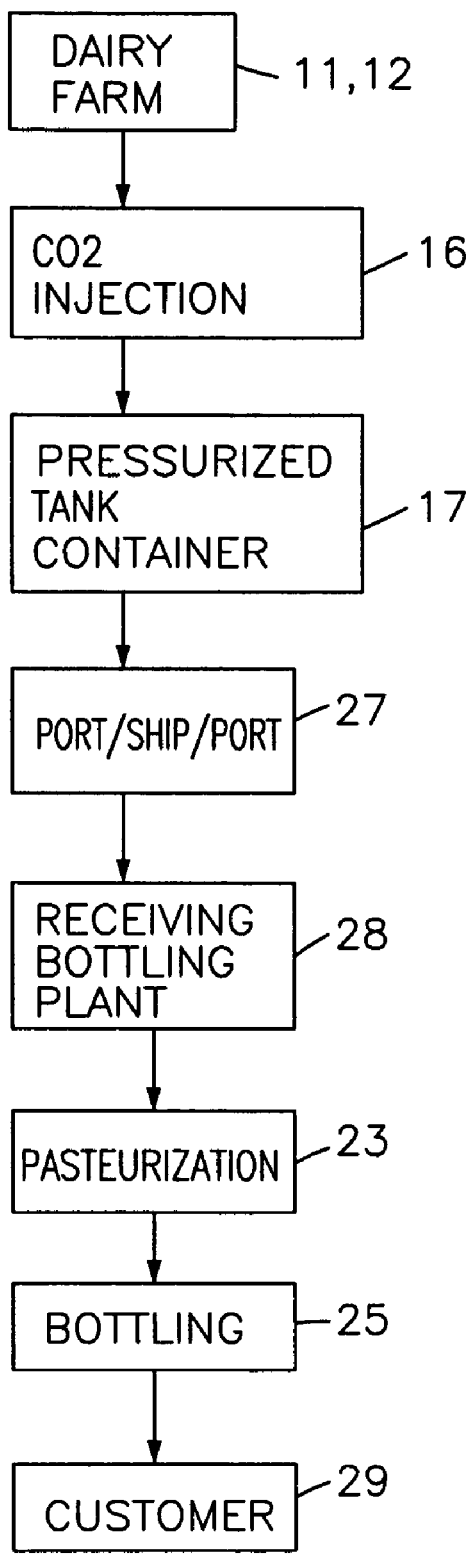
FIG. 2b is a schematic illustration showing a Hawaii Model for shipping milk for extended times and distances.
Figure 3A:
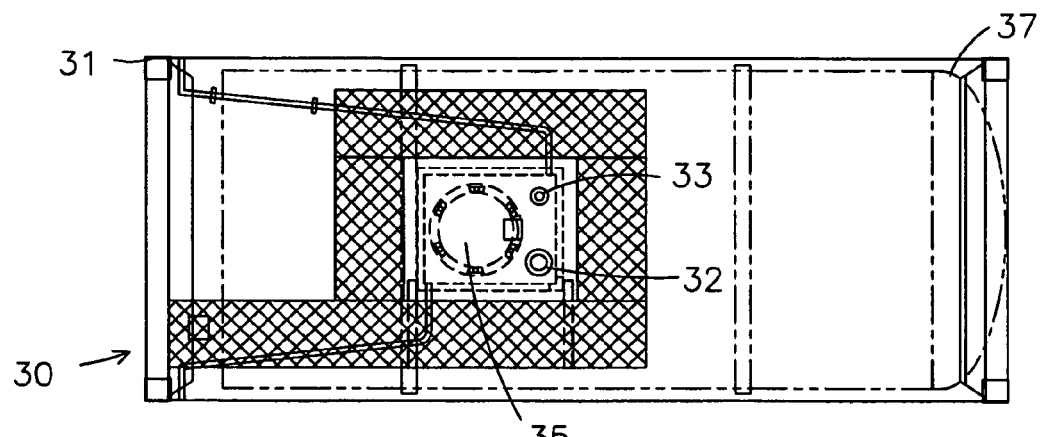
FIG. 3a is a top plan view of a tank container suitable for use in practicing the invention.
Figure 3B:
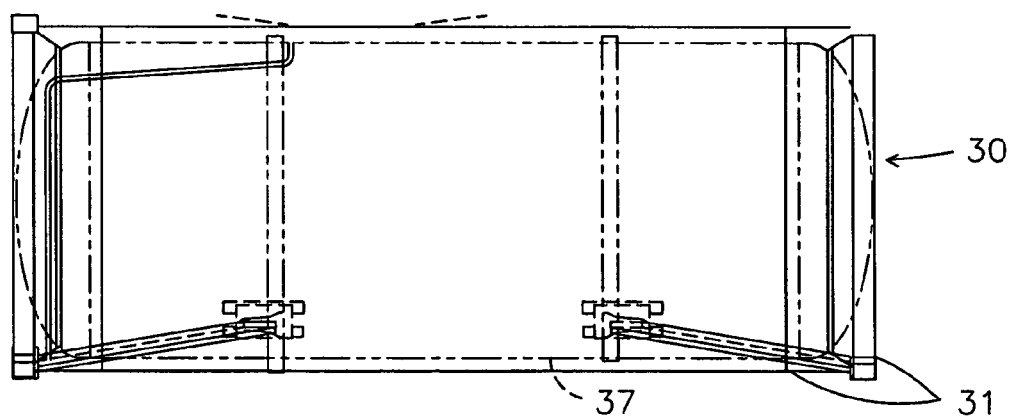
Figure 3C:
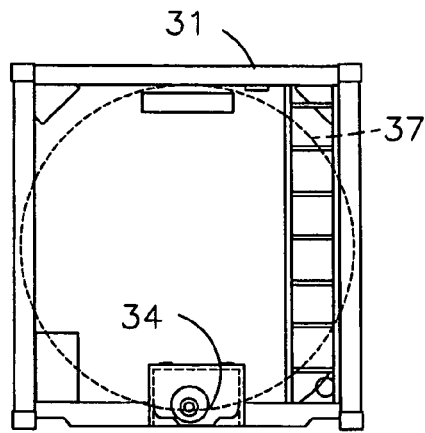
Figure 3D:
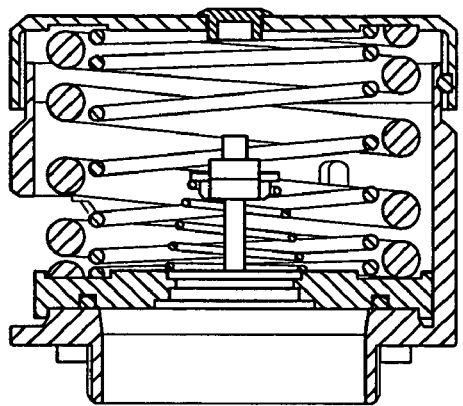
Figure 3E:
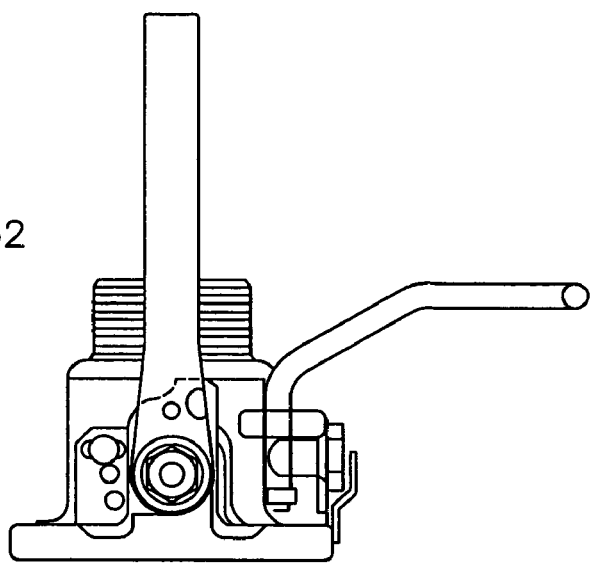
Figure 3F:
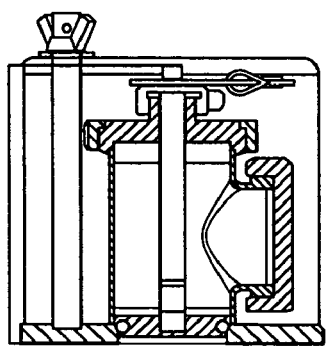

FIG. 2 shows the process that has been utilized to supply milk to Hawaii, a variation of the milk distribution system described in FIG. 1. Here, raw milk is collected from farms 11, 12 by transport tankers 22 and delivered to milk processing facilities 15 near the ports 27 in California using traditional transport means. At the processing facilities 15, the raw milk is pasteurized 23, chilled and pumped into tank containers 24. The tank containers are taken to the shipping docks 27 at the port and transported by cargo ship to Hawaii. In Hawaii, the tank container is discharged from the ship and delivered to another milk processing facility 28 which re-pasteurizes 23 the milk prior to packaging 25 for retail. Alternatively, packaged milk 25 in Southern California may be placed in refrigerated containers 26 and transported by cargo ship 27 to Hawaii for delivery to the customer 29. This alternative eliminates the necessity of pasteurizing the milk twice, but incurs the additional expense of refrigerated shipment and each prepackaged unit has fewer days remaining on its shelf life when delivered to Hawaiian retailers than it would if the milk were processed locally. According to the present invention, these problems are solved by placing raw milk in pressured tank containers 17 with carbon dioxide 16, pressurized, and shipped 27 without either pre-pasteurization or refrigeration.

A preferred transportation container for use in practicing the invention is a vessel sufficiently large so as to hold maximum legal highway weights of product (in the United States roughly 50,000 pounds) and of a sufficient volume to allow the head space to be pressurized. Depending upon the design and tare weight of the pressure vessel and upon the specific gravity of the product hauled, such a unit is preferably between about 4500 and 6500 U.S. gallons in capacity. The container should be food grade or sanitary grade depending upon the product hauled, insulated against significant temperature gain or loss, built as a pressure vessel with a bottom discharge outlet, pressure/vacuum relief valve, and an air inlet. To meet pressure vessel codes and be food grade, construction of a good grade of stainless steel such as 304 or 316 is most typical, but manufacture from other metals such as titanium or of a composite material such as carbon fiber is also possible. The preferred insulating material is a cellular foam, and it is desirable that the insulation provide the container with an R-value of at least about 27.5 and preferably between about 28 and 36. A particularly preferred container is a super-insulated food grade tank container 30, typified by the 22,000 liter model HO4 tank utilized by Agmark Foods, Inc., as shown in FIG. 3.

As shown in FIG. 3, the food grade tank container 30 is constructed as a cylindrical pressure vessel 37, mounted within frame 31 to enable the container to be shipped by truck, rail or ocean. However, suitable tanks may be built for dedicated truck use or as railcars in carload service or adapted to other modes of transportation including bulk ocean shipments. The tank 30 in FIG. 3 has a pressure relief valve 32, an air inlet 33, and a bottom discharge outlet 34. In addition, a manway 35 is located at the top of the tank.

Figure 4:
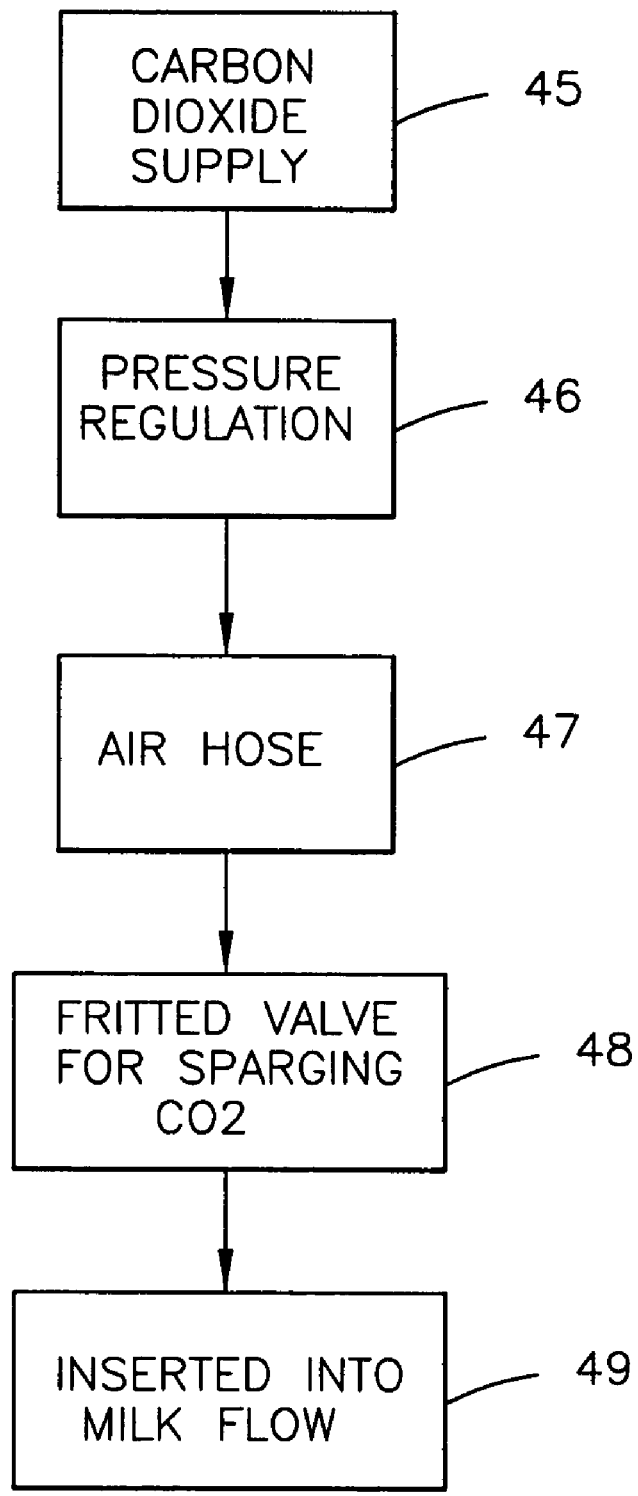
FIG. 4 is a schematic illustration of the carbon dioxide injection system suitable for use when filling the transport containers with organic liquids.
Figure 5:
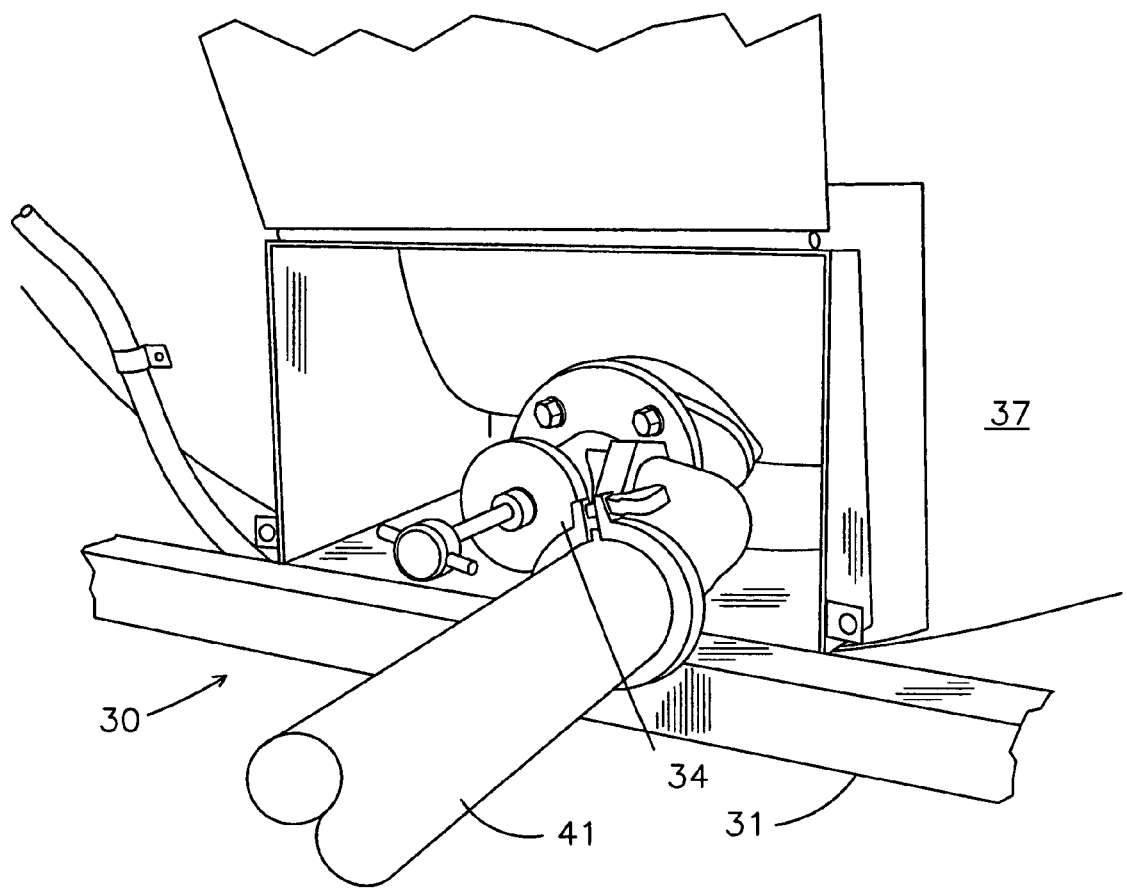
FIG. 5 depicts the loading and unloading connection with a tank container suitable for use in the present invention.
Figure 6:
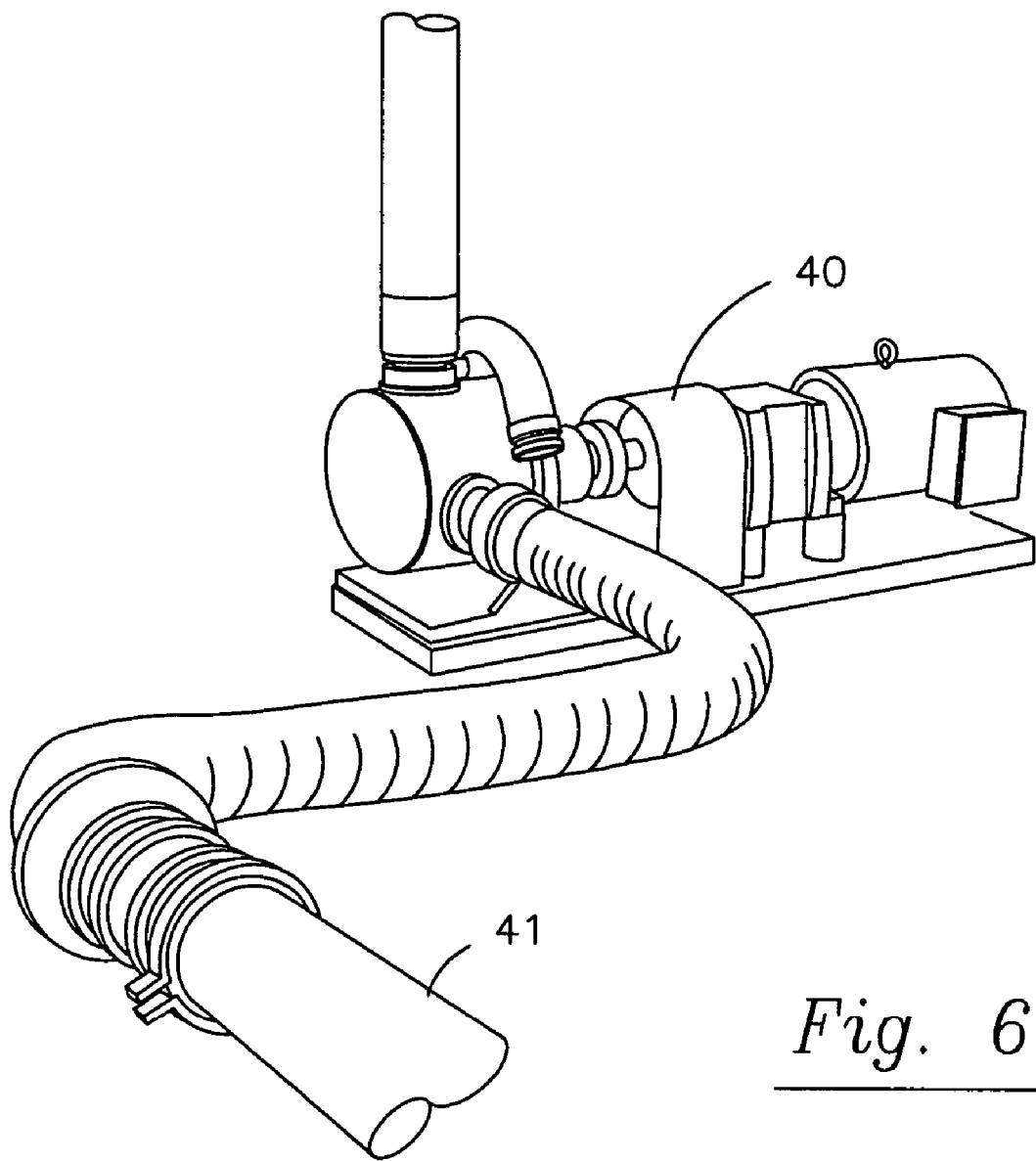
FIG. 6 illustrates a food grade pump for loading or unloading transport tanks.

A preferred method of loading a transport container 30 as shown in FIG. 3 according to the present invention is to pump the milk with a food grade pump 40, shown in FIG. 6, the pump 40 being either on-farm or truck mounted, from its on-farm storage container 13 or by air pressure applied to the on-farm tank 13 (if it is a pressure vessel) or by vacuum applied to the tank container 13, if so designed. The milk will flow through the hoses 41 from the storage tank 13 to an inlet of the transport container 30, generally the bottom discharge assembly 34 shown in FIG. 3. If the product has not already been treated with carbon dioxide, the carbon dioxide will be dissolved into the milk 49 by use of a sparge or fritted nozzle 48, as illustrated in FIG. 4. The nozzle breaks the gas into microscopic bubbles that are easily dissolved into the liquid while the liquid is under some amount of back pressure between the storage tank 13 and the transport tank 17. The amount of carbon dioxide applied is regulated by traditional gas regulators 46 between the carbon dioxide source 45 and the fritted nozzle 48 so that the absorption is achieved at the rate appropriate for the liquid involved. For milk, a $CO_2$ concentration of between about 200 and 2000 parts per million is desired, although levels at 2400 ppm may be realized with satisfactory results.

Figure 8:
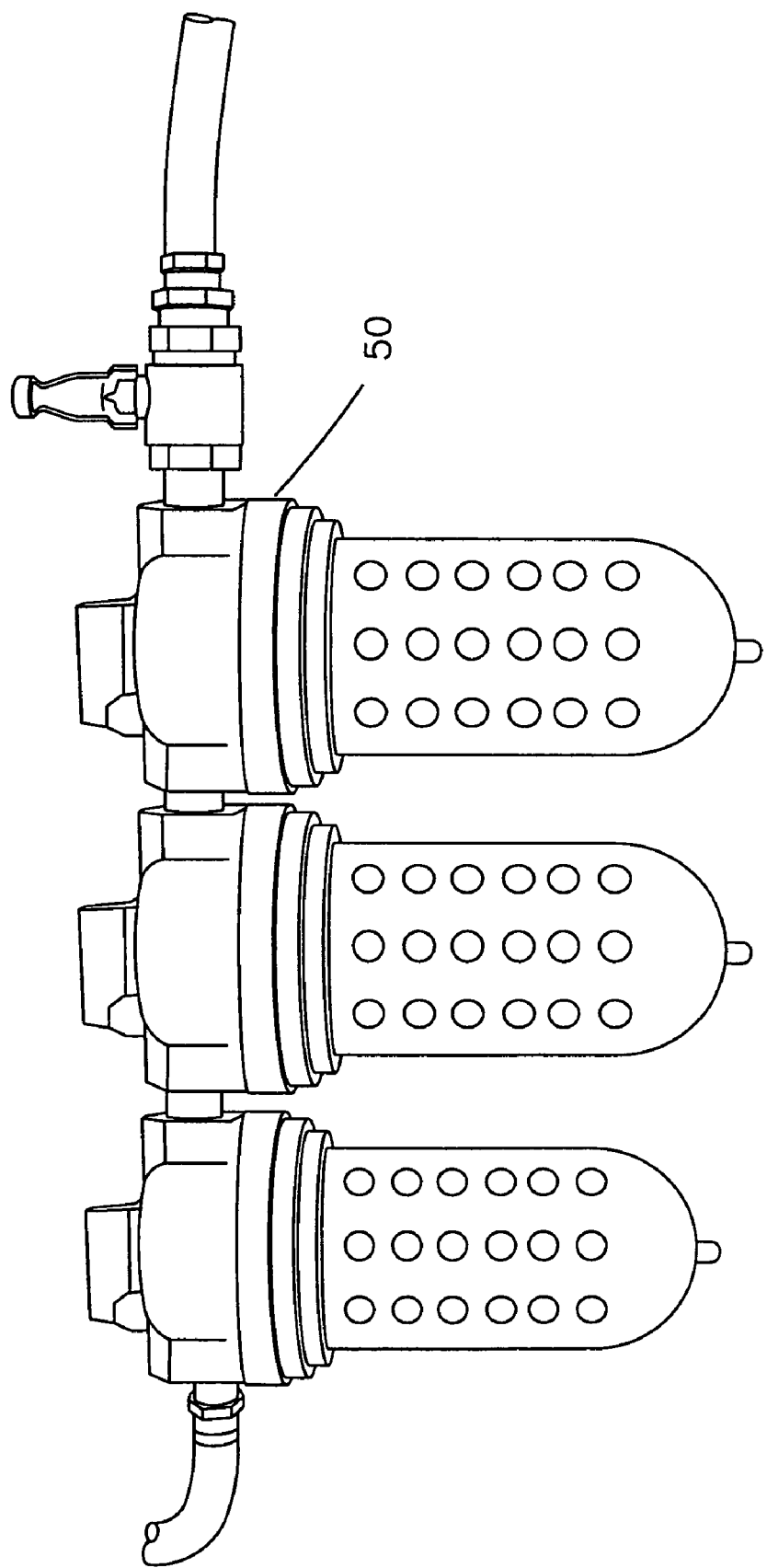
FIG. 8 is a representative three stage filter to clean the air prior to pressurization.

Unloading is accomplished by attaching a hose or stainless steel pipe to the discharge valve 34 of the tank container 30, and to a pump 40. The pump empties the contents of the transport tank 30 through the hose 41 into a plant 15 storage tank for use in the plant's system. According to this invention, it is also possible to unload milk or other organic liquids without use of a pump. This is accomplished by attaching a compressed purified air system such as from triple filtered system 50 in FIG. 8 to the air inlet 33 on the tank 30 and using both the original $CO_2$ pressure and purified air to push the product out of the tank. In the case of milk, it is widely understood that pumping is both necessary and undesirable; necessary in that current milk transport equipment does not accommodate pressure and undesirable in that pumping has a tendency to shear fat molecules in a way that can encourage rancidity. The invention facilitates a completely new set of business practices that can dramatically improve the quality, price, and service associated with moving perishable organic liquids.

EXAMPLES

The first example is a laboratory scale experiment to investigate the effect on raw milk spoilage and pathogenic microbia of holding raw milk under positive $CO_2$ pressures that do not result in precipitation of milk solids. Changes in total *Lactobacillus* spp., lactose fermenting and non-lactose fermenting gram-negative bacteria, *Escherichia coli*, thermoduric bacteria and SPC were examined as indicia of potential milk quality and safety.

Test System Design

Figure 9:
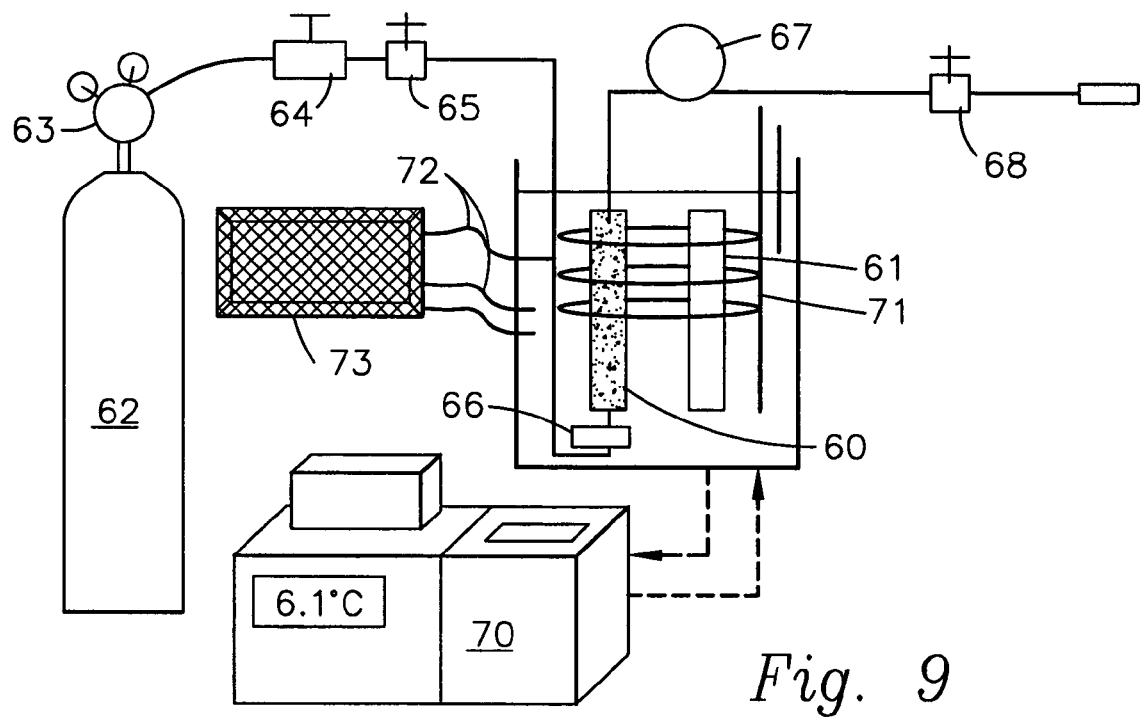
FIG. 9 is a schematic illustration of the carbon dioxide batch pressurization system utilized in connection with Example 1.
Figure 10E:
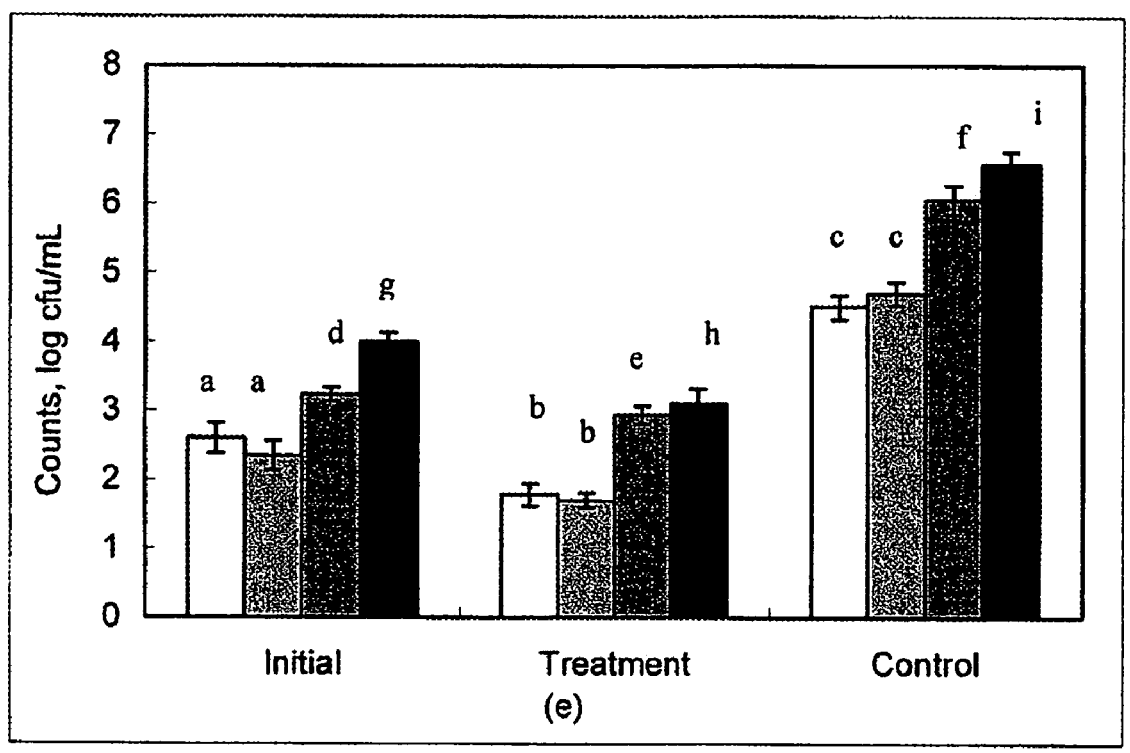
FIGS. 10 (a-e) are bar charts illustrating the changes in gram-negative lactose, *Lactobacillus* spp. and Standard Plate Count in raw milk treated at (a) 68 kPa, (b) 172 kPa, (c) 344 kPa, (d) 516 kPa, and (e) 689 kPa of $CO_2$ pressure at 6.1° C. for four days as described in Example 1.

The apparatus for pressurizing and holding raw milk samples is shown in schematic form in FIG. 9 and consisted of two 13-ml stainless steel 1.27-cm OD cylindrical vessels 60, 61, one vessel 60 was pressurized while the other served as a control 61. Compressed and filtered $CO_2$ from a high-pressure tank 62 was used (Empire Airgas, Inc, Elmira, N.Y.). The system consisted of pressure regulator 63, a fine metering valve 64 (NUPRO Company, Willoughby, Ohio), an on-off valve 65 (Circle Seal, Anaheim, Calif.) and a check valve 66 (NUPRO Company, Willoughby, Ohio). The fine metering valve controlled gas flow such that the time to reach desired pressure was less than five seconds. The gas entered the vertically positioned treatment vessel 60 from the bottom and was thus bubbled through the milk until the set pressure was reached. A check valve 66 was placed immediately before the inlet to the pressure vessel to prevent the backward flow of the fluid milk into the gas inlet line. The outlet of the vessels consisted of a pressure gauge 67 and a high-pressure release valve 68 (High Pressure Equipment, Erie, Pa.). The release valve 68 was kept tightly closed during treatment. The control vessel 61 was closed off from both ends but not connected to the carbon dioxide line inlet and outlet lines.

The apparatus was cleaned and sanitized before and after each treatment as follows: water rinse, Conquest sodium hydroxide (Ecolab Inc., St. Paul Minn.) soak (20 min, 23° C.), warm tap water rinse (50° C.), Monarch CIP phosphoric acid bath immersion (Ecolab Inc., St. Paul, Minn.) (20 minute, 23° C.), warm tap water rinse (50° C.); Tricholoro-o-cide XP (Ecolab Inc, St. Paul, Minn.) soak (30 min, 23° C.), sterile water (50° C.) rinse (3×). This protocol was validated by testing swab samples of critical control points in the dismantled apparatus for microbial load, and testing equipment rinse water pH and residual chlorine content (Hach Company, Loveland, Colo.). Temperature was controlled by a circulating water bath 70 (VWR 1145 Refrigerated Temperature Constant Circulator), which circulated hot/cold water through copper coils 71, immersed into water in a vacuum dewar flask that held the treatment and control vessels. Copper-Constantan thermocouples 72 measured the temperature of the treatment and control vessels, and were continuously logged onto a temperature recorder 73 (Omega Engineering Inc, Stamford, Conn.).

Milk Samples and Treatments

Whole, unhomogenized, raw milk was obtained from two sources. Commingled milk samples were obtained from the Northeast Dairy Herd Improvement Association, Inc. (Ithaca, N.Y.), a dairy analytical consulting laboratory. These samples were commingled bulk milks from 236 farms from New York, Pennsylvania, and New Jersey and thus, could be considered representative of a wide range of milk flora. Milk was also obtained from the Cornell University Teaching and Research Center bovine herd (T&R Center; Dryden, N.Y.). All milk was stored at 6° C. until use. Raw milk from the T&R Center was received in less than 12 hours after milking in sterile bottles and held on ice until it could be moved to a 6° C. cooler.

Milk samples were mixed and 5 ml of milk added into the treatment and control vessels. The treatment vessel was connected to the apparatus and the control vessel closed off. Both vessels were placed in the water bath. When the desired temperatures were attained in both treatment and control vessels, $CO_2$ was introduced through the bottom of the treatment vessel until the set pressure was reached. The $CO_2$ pressure was maintained throughout the test period. When the desired time was reached, the $CO_2$ inlet was turned off, the pressure release valve on the outlet line opened, and the pressure released in under one minute. After depressurization, the treatment and control vessels were removed from the water bath and their external surfaces were wiped dry, sanitized with 95% ethanol, detached from the apparatus and transferred into sterile containers for dilution and plating.

The effect of $CO_2$ pressures and temperature combinations on protein precipitation was measured at $CO_2$ pressures of 344, 689, 1378, 2067, 2757, and 3446 kPa at 20, 10, and 5° C. for 5, 15, 30 and 60 min. The amount of protein precipitation was quantified and expressed as percentage precipitated solids by the method of Tomasula (1995).

Short (<1 h) and longer term (1, 4 and 9 day) experiments were conducted. Raw milk (Northeast Dairy Herd Improvement Association, Inc.; Ithaca, N.Y.) in 5 ml aliquots was treated at each of the following combinations of $CO_2$ pressure, temperature, and time (kPa/° C./min): 1378/5/15, 2757/5/5, 3446/5/5. In longer term studies, raw milk from the T&R Center was first stored at 6° C./48 h so that the SPC were at detectable levels at treatment initiation. Five ml of milk were treated with $CO_2$ pressures of 0 (control), 68, 172, 344, 516 and 689 kPa for 1 to 9 days at 4.1 to 10° C.

Raw milk from the T&R Center was monitored for changes in aerobic bacteria, gram-negative bacteria and total *Lactobacillus* spp. as follows: $CO_2$ pressures of 0 (control), 68, 172, 344, 516 and 689 kPa, at 6.1° C. for 4-days. SPC, gram-negative bacteria and total *Lactobacillus* spp. were enumerated before (day 0) and after (day 4) treatment. Gram negative bacteria were enumerated on MacConkey Agar (Difco Manual, Becton Dickinson & Co., Sparks, Md.), a selective and differential media which can be used to discriminate between lactose fermenting and non-lactose fermenting gram-negative bacteria. Use of this media allows a one-step method of obtaining estimates of both coliform and non-coliform gram negative bacteria. Coliform bacteria may include species of *Escherichia, Klebsiella* and *Enterobacter*, potential pathogens and/or spoilage organisms. Non-coliform gram negative bacteria may include spoilage organisms such as pseudomonads or potential pathogens such as *Salmonella* spp. or *Shigella* spp. Numbers of *Lactobacillus* spp. populations were estimated using acidified (adjusted to pH 5.5 with glacial acetic acid) *Lactobacillus* MRS agar (Difco Manual, Becton Dickinson & Co., Sparks, Md.) after incubation under anaerobic conditions; suspect colonies were confirmed by gram stain.

The time to reach an SPC of $2 \times 10^5$ cfu/ml was determined using raw milk (T&R Center) without a 2-day storage time. Equal volumes were transferred into treatment and control vessels and held at 0 and 689 kPa $CO_2$ and 4.1° C.

The progression of these counts (total, Coliform/*E. coli* and thermoduric bacteria) in the treatment and control samples was tracked by conducting checks on the total aerobic counts (SPC) on treatment days 4 and 6. Based on the levels of total counts on days 4 and 6, analyses of total coli forms/*E. coli* and thermoduric bacteria after day 6 were conducted either in 1-day or 2-day intervals. The control sample final count was measured on days 4 and 6.

Microbiological Methods

For all microbiological assays, milk sample aliquots of 1 ml were used in dilution series. Standard Plate Counts (SPC) were performed by the method described in Standard Methods for the Examination of Dairy Products (Houghtby et al., 1992). Gram-negative bacteria were enumerated on MacConkey agar (Difco Manual, Becton Dickinson & Co., Sparks, Md.) after spread plating and incubation at 30° C. for 48 h. This selective, differential media was used to estimate total lactose fermenting, non-lactose fermenting and total gram negative bacteria. *Lactobacillus* spp. were estimated by pour plating in acidified *Lactobacillus* MRS agar (Difco Manual, Becton Dickinson & Co., Sparks, Md.), incubated at 32° C. for 48 hours under anaerobic conditions. Representative and distinctive suspect colonies were gram stained, and confirmed gram positive bacilli colonies were counted as an estimate of total *Lactobacillus* spp.

Initial total, coliform, and thermoduric counts were each determined for control and treated samples. Thermoduric organisms were enumerated by the laboratory pasteurization count (LPC) method described in the Standard Methods for the Examination of Dairy Products (Houghtby et al., 1992). The 3M Petri film count plate (3M Microbiology Products, St. Paul, Minn.) was used to enumerate total coli forms and *Escherichia coli* in the raw, treated and control milk samples.

Statistical Methods

MINITAB Release 13.1 (Minitac Inc, State College, Pa.) was used for statistical analyses of the data. Analysis of Variance (ANOVA) was used to determine the effect of $CO_2$ pressure, and the interaction effects of pressure and temperature.

Results

Application of $CO_2$ pressures greater than 1378 kPa (200 psi) for 15 to 60 min resulted in more than 1% precipitation of milk solids at 20° C. (data not shown). Treatment for 30 min at 2067 kPa (300 psi) resulted in 2.6% (w/w) solids which approached the maximum (2.8%) found by sulfuric acid precipitation (Southward, 1986); However, lowering the holding temperature reduced the amount of precipitation; at 5° C. and pressures of less than 2067 kPa precipitation could not be detected, even after 60 min. Treatment combinations of 689 kPa for 60 min, 1378 kPa for 30 min, 2757 kPa for 5 min and 3446 kPa for 5 min did not cause detectable precipitation at 5° C.

These results generally agree with previous reports including Jordan et al. (1987), Tomasula (1995), and Calvo and Bacones (2001), who independently investigated the precipitation of caseins from raw skim milk using pressurized $CO_2$. Tomasula (1995) found that $CO_2$ pressures between 2757 and 5514 kPa and temperatures between 38 and 49° C. caused complete casein precipitation. Calvo and Bacones (2001) precipitated 85% of raw skim milk caseins by applying $CO_2$ pressures above 1998 kPa for 3 h at 40° C. Jordan et al. (1987) obtained 99% precipitation of skim milk casein by treatment with 3515 kPa at 50° C.

Protein precipitation occurs when the pH of the milk has been reduced below the isoelectric point of the casein (pH 4.6). The addition of $CO_2$ to milk leads to the formation of carbonic acid and a decrease in pH. In addition, pressurization with $CO_2$ can cause precipitation of caseins at a pH higher than its isoelectric point (Tomasula et al., 1999). Ma and Barbano (2003) found that increasing $CO_2$ concentration and pressure decreased the pH of skim milk; the pressure effect was greater as $CO_2$ concentrations increased. These researchers also determined that increasing temperature affected the solubility of milk colloidal calcium phosphate, resulting in a decrease in milk pH. Jordan et al. (1987) found that precipitation of casein occurred between 40 and 70° C., and that the yield at any specific temperature was dependent upon a minimum pressure; this minimum pressure was inversely related to temperature. Thus, specific pressure/time/temperature treatment combinations must be manipulated so that the conditions do not cause precipitation of proteins from raw milk.

All time-pressure combinations significantly reduced the SPC of the raw milk compared to untreated controls, even at a low pressure and high temperature combination of 68 kPa and 20° C. At 1378 kPa, the control SPC was 7.89 $\log_{10}$ cfu/ml while the treated milk SPC was reduced by 0.33 $\log_{10}$ after 15 min and 0.39 $\log_{10}$ after 30 min. Twenty-four hour treatments at 20° C. and pressures $\geq$344 kPa resulted in microbial inactivation. The SPC of milk treated at 344, 516 and 689 kPa was significantly reduced from initial SPC by 0.39, 0.62 and 0.82 $\log_{10}$, respectively, while the SPC of the control milks significantly (P<0.05) increased by as much as 2.06 $\log_{10}$ cfu/ml. SPC in milk held at 68 and 172 kPa significantly increased by 1.07 and 0.59 $\log_{10}$ cfu/ml, respectively, however this population increase was significantly less than that exhibited by the control milk.

Carbon dioxide pressure treatments of 68 and 172 kPa at 10° C. applied over 24 h were more effective at curtailing growth than similar pressure-time treatments at 20° C. As found at 20° C., there was a loss in viability at pressures $\geq$344 kPa and the differences between control and test counts increased with increasing holding time; significant decreases in counts of 0.31, 0.56 and 0.71 $\log_{10}$ cfu/ml at 344, 516 and 689 kPa $CO_2$, respectively, were achieved. The difference in SPC between control and test milks at 689 kPa was 2.68 $\log_{10}$ cfu/ml. These data indicate that holding raw milk under $CO_2$ pressure not only slowed the growth of the microorganisms in the raw milk but in some cases also surprisingly resulted in a loss in viability of the microorganisms at relatively low pressure levels of only 344 kPa.

The pH of the treated and control milk samples (as measured at atmospheric pressure) was 6.6 to 5.9 at $CO_2$ pressures $\leq$516 kPa and 5.7 when treated at pressures $\geq$516 kPa and 20° C. The pH of the treated and control milk samples, when treated at 10° C., was 5.5 at $CO_2$ pressures $\leq$516 kPa and 5.8 when treated at pressures $\geq$516 kPa.

Others have shown inactivation of microbiota in raw and pasteurized milk with $CO_2$ at significantly higher pressures (Erkman 1997 and 2000; Calvo and Bacones, 2001). Calvo and Bacones (2001) found a decrease in bulk raw milk microbiota of 2 $\log_{10}$ cfu/ml upon treatment with 3997 kPa (or 5800 psi) $CO_2$ at temperatures $\geq$40° C. for 30 min. Erkman (2000) demonstrated a reduction in aerobic microorganisms in whole milk of 6 $\log_{10}$ cfu/ml after a 24 h treatment under 6044 kPa $CO_2$ pressure at 45° C. Erkman (1997) also demonstrated a reduction of 8 $\log_{10}$ cfu/ml after a 5-h 14598 kPa $CO_2$ treatment at 25° C. However, the use of these $CO_2$ pressures would in our experience result in complete precipitation of the caseins and would require the use of specially designed equipment. Calvo and Bacones (2001) reported that pressures of 3997 kPa caused precipitation while Erkman (1997 and 2000) made no mention of the state of the milk. These high pressures, over 3000 kPa, are more appropriate as substitutes for thermal pasteurization of liquids that do not suffer from protein precipitation, but due to equipment requirements are not generally suitable for bulk storage and transportation purposes.

Lowering the holding temperature to 6.1° C. significantly reduced microbial growth compared to control milks when $CO_2$ pressures of 68, 172, 344, 516 and 689 kPa were applied for 4 days. For example, the SPC of milk held at 689 kPa was 0.89 $\log_{10}$ cfu/ml lower than initial counts and 3.48 $\log_{10}$ cfu/ml lower than the controls. Over the course of 9 days, storage under 689 kPa $CO_2$ at 4° C., the ratios of treated to untreated SPC, thermoduric, coliform, and *E. coli* counts were consistently lower than the ratios of control to untreated counts for the comparable groups (cfu/ml) as summarized below in Table 1.

TABLE 1

| | Untreated, | Treated | | | | Control | | | |
|---|---|---|---|---|---|---|---|---|---|
| | Day 0 | 4 Days | 6 Days | 8 Days | 9 Days | 4 Days | 6 Days | 8 Days | 9 Days |
| SPC | $3.0 * 10^{3a}$ | $7.8 * 10^{2b}$ | $4.4 * 10^{4c}$ | $9.7 * 10^{4d}$ | $2.4 * 10^{5e}$ | $1.4 * 10^{5e}$ | $1.2 * 10^{6f}$ | $7.3 * 10^{6g}$ | $9.7 * 10^{6h}$ |
| Thermoduric Bacteria | $1.0 * 10^{0}$ | $1.0 * 10^{0}$ | $9.0 * 10^{0m}$ | $2.1 * 10^{1n}$ | $3.7 * 10^{1o}$ | $1.0 * 10^{0}$ | $8.1 * 10^{1p}$ | $9.6 * 10^{1q}$ | $1.0 * 10^{2r}$ |
| Coliforms | $1.1 * 10^{2h}$ | $1.0 * 10^{2h}$ | $1.0 * 10^{2h}$ | $9.3 * 10^{1h}$ | $9.0 * 10^{1h}$ | $4.0 * 10^{2h}$ | $4.3 * 10^{2i}$ | $5.5 * 10^{2i}$ | $7.8 * 10^{2j}$ |
| E. coli | $2.0 * 10^{1k}$ | $1.7 * 10^{1k}$ | $1.7 * 10^{1k}$ | $1.7 * 10^{1k}$ | $1.5 * 10^{1k}$ | $3.6 * 10^{1l}$ | $3.9 * 10^{1l}$ | $6.1 * 10^{1l}$ | $7.4 * 10^{1l}$ |

The effect of 689 kPa $CO_2$ pressure at 4° C. after 4, 6, 8 and 9-day treatments on the SPC, thermoduric bacteria, coliforms and *E-coli* counts in untreated, treated and control raw milks. Experiment conducted in duplicate, n = 2 (2 milk samples analyzed), each sample plated in triplicate. Counts with different letters are significantly different (P $\leq$ 0.05).

Milks treated at 68, 172, 344 and 516 kPa significantly increased from an initial SPC of approximately 3.30 $\log_{10}$ cfu/ml by 1.28, 1.10, 0.94 and 0.82 $\log_{10}$ cfu/ml, respectively, while the control SPC increased by 2.86, 2.85, 2.86 and 2.93 $\log_{10}$ cfu/ml, respectively. Milk held at 689 kPa treatment at 6.1° C. for 4 days exhibited greater inactivation than that exhibited after the 10 or 20° C. 24 h treatments (P<0.05). The pH decreased from 6.6 before treatment to 5.5 in milks treated at 516 kPa, 5.8 at 344 kPa and 5.9 at 68 kPa.

In addition to SPC, there were significant differences in gram-negative lactose fermenting and non-lactose fermenting bacteria and *Lactobacillus* spp. between $CO_2$ treated and control milks as shown in FIGS. 10a-10e. In these bar charts, the first bar is gram-negative lactose fermenting bacteria, the second gram-negative non-lactose fermenting bacteria, the third *Lactobacillus* spp.; and the final bar is SPC. Thus, levels of gram-negative fermenters and non-fermenters were reduced at all pressures compared to untreated controls. Likewise, *Lactobacillus* spp. counts were approximately 1 to 2 $\log_{10}$ cfu/ml lower in the test milks compared to control milk. At 689 kPa, gram-negative lactose fermenting and non-lactose fermenting bacteria exhibited significant decreases of 0.80 and 0.64 $\log_{10}$ cfu/ml, respectively, compared to initial counts. Under 516 kPa $CO_2$ pressure, SPC of treated samples were not significantly different from initial untreated samples while SPC of control samples increased by 2.95 $\log_{10}$ cfu/ml Reductions in total microbial populations as well as reductions in gram-negative and *Lactobacillus* spp. populations would result in improved quality of the raw milk. Ruas-Madiedo et al. (1996) found that lower levels of volatile compounds (ethanol, 2-propanone, and 2-butanone, which are microbial metabolites) were produced in carbonated milk during storage and that higher sensory scores were achieved than in untreated milks. In a later study, Ruas-Madiedo et al. (2000) found a direct association between reduced microbial growth and reduced levels of microbial glucosidases in raw milk stored with $CO_2$; degradation of milk glucose was subsequently reduced in the treated milks. It has also been found that levels of fat-soluble vitamins (retinol, -β-carotene and α-tocopherol) in milk treated with $CO_2$ and stored at 4° C. for 7 days were higher than that measured for untreated raw and pasteurized milks (Ruas-Madiedo et al., 1998a, b).

In the current study, populations of *Lactobacillus* decreased after $CO_2$ pressure treatment. Others have found that treatment with $CO_2$ concentrations between 0 and 2000 mg/l had no impact on the lag phase of *Lactobacillus sake* when grown at 7° C., and influences on the maximum specific growth rate was least affected as compared to species of *Pseudomonas, Aeromonas, Bacillus, Brochothrix* and *Shewanella* (Devlieghere and Debevere, 2000). Espie and Madden (1997) reported no effect of 30 and 45 ppm $CO_2$ on the growth of *Lactobacillus* spp. Neither of these investigations, however, incorporated pressures above atmospheric in their treatments. Reductions in populations of *Lactobacillus plantarum* of more than 6 logs was achieved after treatment with $CO_2$ pressures of 13 MPa at 30° C. for 30 minutes (Hong and Pyun, 1999). In subsequent studies, these researchers found that high pressure $CO_2$ treatment of *L. plantarum* resulted in irreversible cellular membrane damage and reduced activity of some intracellular enzymes, physiological changes that could result in microbial inactivation (Hong and Pyun, 2000). Combined or enhanced effects of low pressures and $CO_2$ treatments could explain the observed reductions in total *Lactobacillus* populations.

Figure 11:
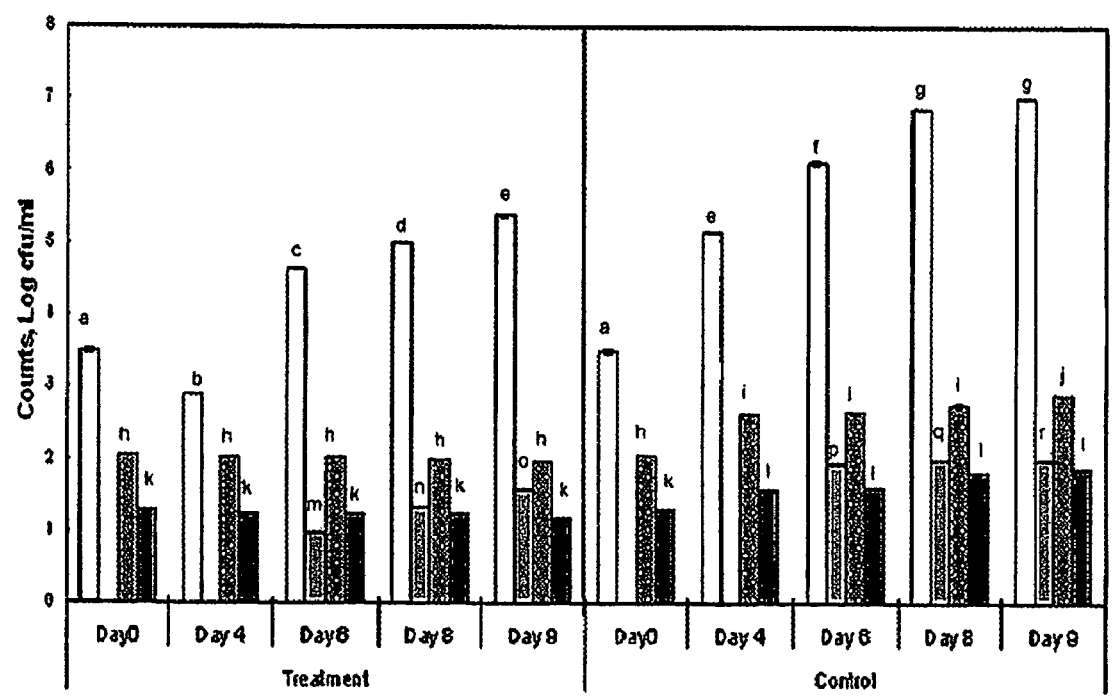
FIG. 11 is a bar chart of total counts, thermoduric bacteria, total coliforms and *E. coli* counts in raw milk treated at 4° C. and 689 kPa of $CO_2$ pressure after 4, 6, 8 and 9 days as described in Example 1.

The effect of 689 kPa $CO_2$ at 4° C. on the time to reach an SPC of $10^5$ cfu/ml was investigated. Pasteurized Milk Ordinance Grade A regulations specifies the SPC for raw milk should be less than $10^5$ cfu/ml prior to pasteurization. As shown in FIG. 11, where the columns sequentially represent total counts, thermoduric bacteria, total coliforms, and *E. coli*, the treated milks reached $10^5$ cfu/ml after 8 days of treatment, whereas the control milk reached this level after just four days. Treatment at 689 kPa and 4° C. extended the treatment holding time at least four days as compared to the control. At the end of four days treatment, treated milk SPC had decreased to 2.89 $\log_{10}$ cfu/ml from 3.48 $\log_{10}$ cfu/ml while control milk SPC increased by nearly 5 $\log_{10}$ cfu/ml. This reduction in SPC in treated milk agrees with the trend observed in the four-day experiments conducted at 6.1° C. (FIG. 10). Milk SPC increased to 4.64, 4.99 and 5.37 $\log_{10}$ cfu/ml after 6, 8 and 9 days treatment, respectively (FIG. 11). Neither *E. coli* nor total thermoduric bacteria counts increased in the treated milk but both significantly increased in the controls. The pH of the treated milk samples changed from an initial value of 6.6 to 5.5 at the end of days 4, 6, 8 and 9 of treatment.

Example 2

This second example was an experiment designed to confirm the preliminary results of the first example on a commercial or bulk scale.

Test System Design

The apparatus pressurizing and holding raw milk samples consisted of a 5300 U.S. gallon (20,000 liter) food grade, insulated, pressure vessel shipping container of the model HO4 type utilized by Agmark Foods, Inc. Compressed and filtered $CO_2$ from high pressure tank was used, including a Praxair inline 3A sparger. The Agmark shipping container was sanitized on Aug. 4, 2004. The following day, the tank was pre-chilled with a spray of $CO_2$ and filled with 3,291 U.S. gallons of fresh raw milk obtained from the Cornell University Teaching and Research Center Bovine Heard (T&R Center; Dryden, N.Y.) on Aug. 5, 2004. The raw milk from the T&R Center was received less than 12 hours after milking and was introduced from a holding tank into the pressure vessel at a temperature of approximately 1 to 2° C. Prior to filling the pressure vessel, the vessel was sealed and pressurized with carbon dioxide to a pressure of 25 psi (172.5 kPa). Milk was pumped into the tank through the discharge valve at the rear of the tank and $CO_2$ was injected into the flow of the milk with an inline Praxair 3A sparger at a rate sufficient to infuse approximately 2000 parts per million at a gas flow rate of approximately 16 cubic feet per minute. The raw milk was pumped into the vessel at a flow rate of 70 to 80 gallons per minute with flowing $CO_2$ under a 40 psi line pressure and 25 psi tank pressure. At the conclusion of loading, the temperature of the milk was at 2.5° C. with a tank pressure of 43 psi.

Samples were taken daily from 17 consecutive days from both the top and bottom of the pressure vessel. A control sample of five gallons of untreated milk was held at approximately 2° C. for the duration of the study and similarly sampled. Microbiological methods consistent with those described in the first example were utilized.

The data in Table 2 reflects bacterial growth (SPC log cfu/ml), thermoduric count psychrotropic count, *E. coli* and coliform count, pH, and $CO_2$ content, while Table 3 provides measurements of milk and environmental temperatures.

TABLE 2

Laboratory test data for control and CO2 treated whole raw milk: SPC, Thermoduric count, Psychrotrophic count, *E. coli* and Coliform count, Ph, CO2 content

| Date | Day | Control | SPC Top | cufu/ml Bottom | *E. coli*/Coliforms Control | | Top | | Bottom | |
|---|---|---|---|---|---|---|---|---|---|---|
| 80504 | 1 | 3.69E+03 | 2.99E+03 | 3.19E+03 | <1e0 | 9.15E+01 | <1e0 | 8.95E+01 | <1e0 | 1.10E+02 |
| 80604 | 2 | 6.00E+03 | 2.04E+04 | 5.05E+02 | <1e1 | 4.50E+01 | 1.00E+01 | 9.95E+02 | 1.00E+01 | 1.00E+01 |
| 80704 | 3 | 3.00E+03 | 4.30E+02 | 3.40E+02 | 1.00E+01 | 1.75E+02 | <1e1 | <1e1 | 1.50E+00 | <1e0 |
| 80804 | 4 | 3.95E+03 | 2.69E+02 | 1.02E+02 | 1.00E+00 | 3.00E+01 | 1.00E+00 | 4.00E+00 | <1e0 | 1.00E+00 |
| 80904 | 5 | 3.95E+03 | 2.00E+02 | 1.05E+02 | 2.00E+00 | 3.15E+01 | <1e0 | 5.00E+00 | <1e0 | <1e0 |
| 81004 | 6 | 2.75E+03 | 1.89E+03 | 1.01E+02 | 2.00E+00 | 2.95E+01 | 1.50E+00 | 1.85E+01 | <1e0 | <1e0 |
| 81104 | 7 | 2.84E+03 | 1.76E+03 | 3.25E+02 | 1.00E+00 | 2.90E+01 | <1e0 | 1.15E+02 | <1e0 | 1.45E+01 |
| 81204 | 8 | 3.49E+03 | 1.61E+04 | 1.77E+02 | <1e0 | 2.15E+01 | <1e0 | 2.72E+02 | <1e0 | 6.30E+01 |
| 81304 | 9 | 4.45E+03 | 1.27E+04 | 4.20E+01 | <1e0 | 2.10E+01 | <1e0 | 2.84E+02 | <1e0 | <1e0 |
| 81404 | 10 | 3.65E+03 | 9.55E+03 | 4.50E+01 | — | — | — | — | — | — |
| 81504 | 11 | 8.65E+04 | 3.14E+04 | 5.05E+02 | <1e0 | 1.40E+01 | <1e0 | 1.60E+02 | <1e0 | <1e0 |
| 81604 | 12 | 1.76E+05 | 4.50E+04 | 2.05E+01 | — | — | — | — | — | — |
| 81704 | 13 | 1.12E+06 | 4.10E+05 | 2.00E+01 | <1e0 | 1.50E+01 | <1e0 | <1e0 | <1e0 | <1e0 |
| 81804 | 14 | | | | <1e0 | 9.15E+01 | <1e0 | 8.95E+01 | <1e0 | 1.10E+02 |
| 81904 | 15 | | | | <1e1 | 4.50E+01 | 1.00E+01 | 9.95E+02 | 1.00E+01 | 1.00E+01 |
| 82004 | 16 | | | | 1.00E+01 | 1.75E+02 | <1e1 | <1e1 | 1.50E+00 | <1e0 |
| 82104 | 17 | | | | 1.00E+00 | 3.00E+01 | 1.00E+00 | 4.00E+00 | <1e0 | 1.00E+00 |
| 82204 | 18 | | | | 2.00E+00 | 3.15E+01 | <1e0 | 5.00E+00 | <1e0 | <1e0 |

| | Thermodurics | | | Psychrotrophics | | | Ph | | | ppm $CO_2$ | | |
|---|---|---|---|---|---|---|---|---|---|---|---|---|
| Date | Control | Top | Bottom | Control | Top | Bottom | Control | Top | Bottom | Control | Top | Bottom |
| 80504 | 3.15E+02 | 1.00E+01 | 1.00E+01 | <1e1 | <1e1 | <1e1 | 6.6 | 5.9 | 5.9 | 129 | 2001 | 2190 |
| 80604 | 8.20E+02 | 4.25E+02 | 5.00E+01 | 6.50E+00 | <1e0 | <1e0 | 6.6 | 5.9 | 5.9 | 103 | 1988 | 2004 |
| 80704 | 5.10E+02 | 4.50E+02 | 3.50E+00 | 8.00E+00 | 5.00E+00 | 5.00E+00 | 6.7 | 6 | 5.9 | 103 | 2125 | 1985 |
| 80804 | 5.20E+02 | 6.00E+00 | 1.00E+00 | 2.10E+01 | 2.00E+00 | 3.00E+00 | 6.7 | 6 | 5.9 | 94 | 2091 | 1950 |
| 80904 | 5.20E+02 | 1.00E+00 | 1.00E+00 | 3.10E+01 | <1e1 | <1e1 | 6.8 | 6 | 6 | 90 | 2070 | 2071 |
| 81004 | 2.81E+02 | 5.00E+01 | 3.50E+00 | | | | 6.8 | 6 | 5.9 | 90 | 2055 | 2128 |
| 81104 | 1.89E+02 | 4.00E+01 | 2.00E+00 | | | | 6.8 | 6 | 5.9 | 90 | 2274 | 2043 |
| 81204 | 2.80E+02 | 2.22E+03 | 1.50E+00 | | | | 6.7 | 6 | 6 | 90 | 2898 | 1970 |
| 81304 | 1.89E+02 | 1.15E+03 | <1e0 | | | | 6.8 | 6 | 6 | 90 | 2884 | 1920 |
| 81404 | 6.15E+02 | 6.45E+02 | 3.00E+00 | | | | 6.8 | 6 | 6 | 90 | 2250 | 2146 |
| 81504 | 2.05E+02 | 5.20E+02 | <1e0 | | | | 6.7 | 6 | 6 | 90 | 2740 | 1943 |
| 81604 | 4.55E+02 | 8.05E+03 | <1e0 | | | | 6.8 | 6 | 6 | 90 | 2477 | 2060 |
| 81704 | 4.75E+02 | 1.77E+02 | 1.00E+00 | | | | 6.8 | 6 | 6 | 100 | 2250 | 2146 |
| 81804 | 3.15E+02 | 1.00E+01 | 1.00E+01 | | | | 6.8 | 6 | 6 | 103 | 2236 | 2126 |
| 81904 | 8.20E+02 | 4.25E+02 | 5.00E+01 | | | | 6.7 | 6 | 6 | 103 | 3311 | 2198 |
| 82004 | 5.10E+02 | 4.50E+02 | 3.50E+00 | | | | | | | | | |
| 82104 | 5.20E+02 | 6.00E+00 | 1.00E+00 | | | | | | | | | |
| 82204 | 5.20E+02 | 1.00E+00 | 1.00E+00 | | | | | | | | | |

TABLE 3

Temperature date (° F. in the vicinity of the Hartford, NY Cornell University Teaching and Research Center (CLIMOD database) from Tompkins County, Ithica station

| | | Sample Temperature ° C. | | | Sample Temperature ° F. | | | High Temp | Low Temp | Avg Temp |
|---|---|---|---|---|---|---|---|---|---|---|
| Day | Day | Control | Top | Bottom | Control | Top | Bottom | | | |
| 80504 | 1 | 2 | 2.6 | 2.6 | 36.6 | 36.6 | 36.6 | 75 | 61 | 68 |
| 80604 | 2 | 2 | 2.3 | 2.6 | 35.6 | 36 | 36.4 | 69 | 47 | 58 |
| 80704 | 3 | 2 | 4.6 | 2.7 | 35.6 | 40.3 | 36.7 | 62 | 52 | 57 |
| 80804 | 4 | 2 | 4.1 | 2.9 | 35.6 | 39.4 | 37.3 | 65 | 53 | 59 |
| 80904 | 5 | 3 | 4.1 | 3.8 | 37.4 | 39.8 | 39 | 74 | 51 | 63 |
| 81004 | 6 | 2 | 7 | 4.9 | 35.6 | 44.7 | 40.5 | 80 | 57 | 69 |
| 81104 | 7 | 2 | 8.5 | 4.8 | 35.6 | 47 | 40.3 | 80 | 61 | 71 |
| 81204 | 8 | 2 | 8.9 | 5.6 | 35.6 | 47.6 | 41.9 | 75 | 60 | 68 |
| 81304 | 9 | 2 | 8.8 | 5.8 | 35.6 | 47.4 | 42.1 | 66 | 60 | 63 |
| 81404 | 10 | 2 | 10.1 | 6.4 | 35.6 | 49.5 | 43 | 72 | 59 | 66 |
| 81504 | 11 | 2 | 10.1 | 8.9 | 35.6 | 50 | 47.7 | 73 | 53 | 63 |
| 81604 | 12 | 2 | 10.4 | 8.2 | 35.6 | 50.4 | 46.5 | 75 | 55 | 65 |

TABLE 3-continued

Temperature date (° F. in the vicinity of the Hartford, NY
Cornell University Teaching and Research Center
(CLIMOD database) from Tompkins County, Ithica station

| Day | Day | Sample Temperature ° C. | | | Sample Temperature ° F. | | | High Temp | Low Temp | Avg Temp |
|---|---|---|---|---|---|---|---|---|---|---|
| | | Control | Top | Bottom | Control | Top | Bottom | | | |
| 81704 | 13 | 2 | 10.4 | 8.4 | 35.6 | 50.6 | 47 | 74 | 50 | 62 |
| 81804 | 14 | 2 | 10.7 | 8.5 | 35.6 | 50.8 | 47.2 | 80 | 53 | 67 |
| 81904 | 15 | 2 | | | | | | | | |

Comment: Bottom tank sample averaged a daily increase of 0.75 degree F. while the top tank sample averaged a daily increase of 1 degree F.

Figure 12A:
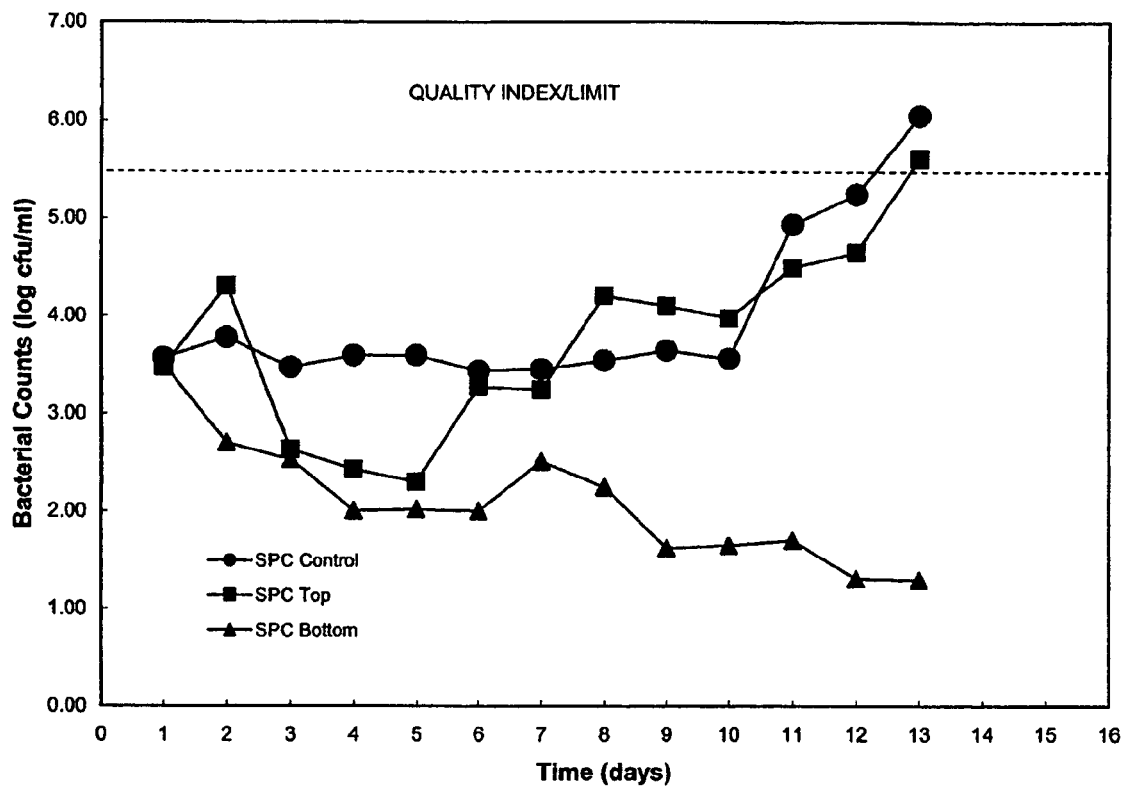
FIG. 12a is a chart plotting bacterial growth in raw whole milk treated with 2000 ppm $CO_2$ against an untreated but refrigerated control over 13 days as described in Example 2.
Figure 12B:
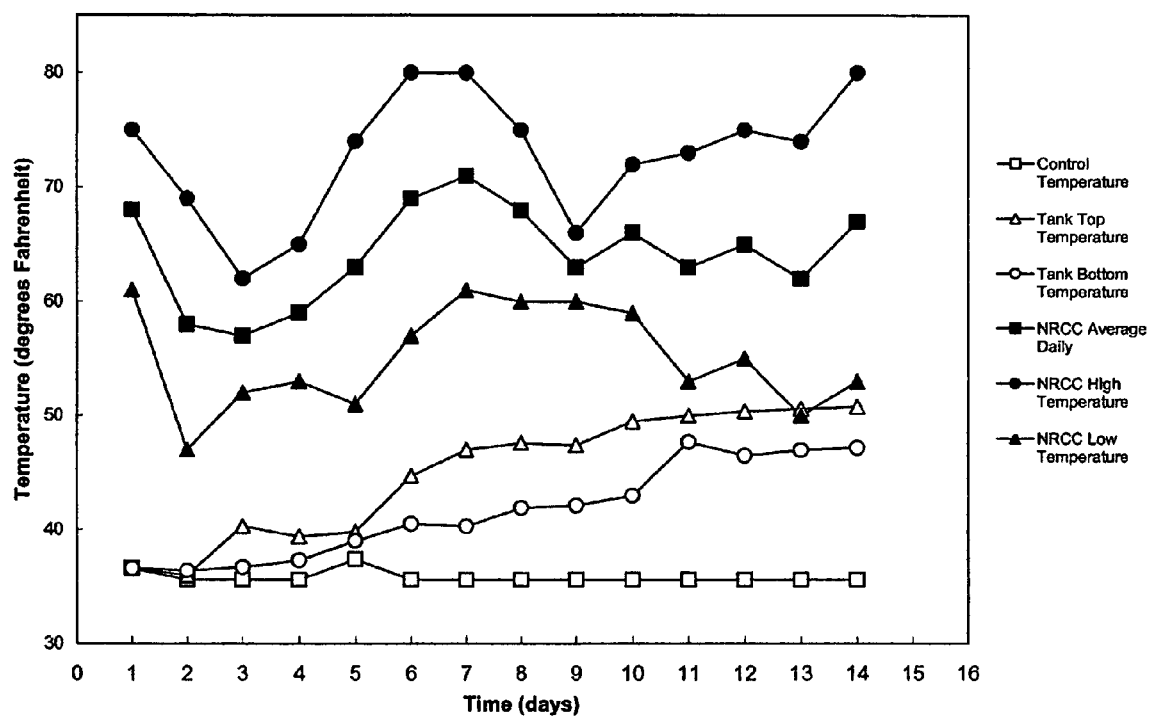
FIG. 12b is a chart plotting temperatures of the milk of Example 2 and the daily local temperatures.

A microbial quality limit of 5 log cfu/ml SPC was adopted from the U.S. Department of Health and Human Services, Public Health Service and Food and Drug Administration Grade A PMO standards for individual producer grade "A" raw milk. As shown in FIG. 12a, the total microbial growth did not reach levels of the quality limit until day 11 for the control milk and day 12 to 13 for the top tank milk. Bacterial levels in the bottom of the tank did not reach the limit during the entire 17 day study and actually decreased from the first day's measurement although the temperature had increased to approximately 9° C. (FIG. 12b) The low pressure $CO_2$ storage extended the shelf life of the raw milk by 4 to 5 days with no added refrigeration or measurable increase in food safety risk. Due to the stationary nature of the test, milk fat separated and formed a denser layer at the top in which most pathogens were concentrated. A natural agitation of raw milk product during transit would mitigate this effect. Certain low fat products may actually achieve reduced microbial counts over time under similar $CO_2$ pressures.

REFERENCES

Calvo, M. M. and E. Balcones. 2001. Inactivation of microorganisms and changes of proteins during treatment of milk with subcritical carbon dioxide. Milchwissenschaft 56(7):366-369.

Daniels, I. A., R. Krishnamurthi, and S. S. H. Rizvi. 1985. A review of effects of carbon dioxide on microbial growth and food quality. J. Food Proto 48(6):532-537.

Devlieghere, F. and 1. Debevere. 2000. Influence of dissolved carbon dioxide on the growth of spoilage bacteria. Lebens. Wissen. Tech. 33(8):531-537.

Dixon, N. M. and D. B. Kell. 1989. The inhibition by carbon dioxide of the growth and metabolism of microorganisms. 1. Appl. Bacteriol. 67: 109-136.

Enfors, S. O. and G. Molin. 1978. Influence of high concentrations of carbon dioxide on germination of bacterial spores. J. Appl. Bacteriol. 45:279-285.

Enfors, S. O. and G. Molin. 1981. The influence of temperature on the growth inhibitory effect of carbon dioxide on *Pseudomonas fragi* and *Bacillus cereus*. Can. 1. Microbiol. 27(1):15-19.

Erkman, O. 1997. Antimicrobial effect of pressurized carbon dioxide on *Staphylococcus aureus* in broth and milk. Lebens. Wissen. Tech. 30:826-829.

Erkman, O. 2000. Antimicrobial effect of pressurized carbon dioxide on *Enterococcus faecalis* in physiological saline and foods. 1. Sci. Food Agri. 80:465-470.

Espie, W. E. and R. H. Madden. 1997. The carbonation of chilled bulk milk. Milchwissenschaft 52:249-253.

Gill, C. O. and K. H. Tan. 1979. Effect of carbon dioxide on growth of *Pseudomonas fluorescens*. Food Microbial. 4:285-291.

Griffiths, M. W., J. D. Phillips, and D. D. Muir. 1987. Effect of low temperature storage on the bacteriological quality of raw milk. Food Microbiol. 4:285-291.

Haas, G. J., H. E. Prescott, E. Dudley, R. Dik, C. Hintlain, and L. Keane. 1989. Inactivation of microorganisms by carbon dioxide under pressure. J. Food Safety 9:253-265.

Hendricks, M. T. and T. H. Hotchkiss. 1997. Effect of carbon dioxide on the growth of *Pseudomonas fluorescens* and *Listeria monocytogenes* in aerobic atmospheres. J. Food Prot. 60: 1548-1552.

Hong, S. L, Pard, W. S., and Y. R. Pyun. 1999. Non-thermal inactivation of *Lactobacillus plantarum* as influenced by pressure and temperature of pressurized carbon dioxide. Int. J. Food Sci. Technol 34:125-130.

Hong, S. I. and Y. R. Pyun. 2001. Membrane damage and enzyme inactivation of *Lactobacillus plantarum* by high pressure $CO_2$ treatment. Int. J. Food Microbial. 63:19-28.

Hotchkiss, J. H. 1996. Commitment to cottage cheese. Dairy Foods 29.

Houghtby, G. A., L. J. Maturin, and E. K. Koenig. 1992. Microbiological count methods. Pages 213-246 in Standard Methods for the Examination of Dairy Products. 16 ed. T. R.

Marshall, ed. American Public Health Association, Washington.

Jordan, P. J., K. Lay, N. Ngan, and G. F. Rodley. 1987. Casein precipitation using high pressure carbon dioxide. New Zealand J. Dairy Sci. Technol. 22:247-256.

King, J. S. and L. A. Mabbitt. 1982. Preservation of raw milk by the addition of carbon dioxide. J. Dairy Res. 49:439-447.

Ma, Y. and D. M. Barbano. 2003. Effect of temperature of $CO_2$ injection on the pH and freezing point of milks and creams. J. Dairy Sci. 86(5):1578-1589.

Mabbitt, L. A. 1982. Preservation of refrigerated milk. Kieler Milchwirtschaftliche Forschungsherichte 34:28-31.

Martin, J. D., B. G. Werner, and J. H. Hotchkiss. 2003. Effects of carbon dioxide on bacterial growth parameters in milk as measured by conductivity. J. Dairy Sci. 86(6):1932-1940.

Muir, D. D., J. D. Phillips, and D. G. Dalgleish. 1979. Lipolytic and proteolytic activity of bacteria isolated from blended raw milk. J. Society Dairy Technol. 32: 19-23.

Roberts, R. F. and G. S. Torrey. 1988. Inhibition of psychrotrophic bacterial growth in refrigerated milk by addition of carbon dioxide. J. Dairy Sci. 71:52-60.

Rowe, M. T. 1989. Carbon dioxide to prolong the safe storage of raw milk. The Milk Industry 91:17-19.

Ruas-Madiedo, P., Bada-Gancedo, J. C., Fernandez-Garcia, E., Gonzalez De Llano, D., and C. G. De Los Reyes-Gavilan. 1996. Preservation of the microbiological and biochemical quality of raw milk by carbon dioxide addition: A pilot-scale study. J. Food Proto 59:502-508.

Ruas-Madiedo, P., Bascaran, V., Brana, A. F., Bada-Gancedo, J. C., and C. G. De Los Reyes-Gavilan. 1998a. Influence of carbon dioxide addition to raw milk on microbial levels and some fat-soluble vitamin contents of raw and pasteurized milk. J. Agric. Food Chem. 49: 1552-1555.

Ruas-Madiedo, P., Bascaran, V., Brana, A. F., Bada-Gancedo, J. C., and C. G. De Los Reyes-Gavilan. 1998b. Influence of carbon dioxide addition to raw milk on microbial levels and some fat-soluble vitamin contents of raw and pasteurized milk (correction). 1. Agric. Food Chem. 46:2894-2894.

Ruas-Madiedo, P., De Los Reyes-Gavilan, C. G., Olano, A., and M. Villamiel. 2000. Influence of refrigeration and carbon dioxide addition to raw milk on microbial levels, free monosaccharides and myo-inositol content of raw and pasteurized milk. Eur. Food Res. Technol. 212:44-47.

Shipe, W. F., R. Bassette, D. D. Deane, W. L. Dunkley, E. G. Hammond, W. V. Harper, D. H. Kleyn, M. F. Morgan, J. H. Nelson, and R. A. Scalan. 1978. Off flavors of milk: Nomenclature standards and bibliography. J. Dairy Sci. 61:855.

Southward, C. R. 1986. Utilization of milk components: Casein. Pages 317-368 in Modern Dairy Technology: Advances in Milk Processing. Vol. 1. R. K. Robinson, cd. Elsevier Applied Science Publishers, London.

Tomasula, P. M. 1995. Preparation of casein using carbon dioxide. J. Dairy Sci. 78:506-514.

Tomasula, P. M. and R. T. Boswell. 1999. Measurement of the solubility of carbon dioxide in milk at high pressures. 1Supercrit. Fluids 16:21-26.

U.S. Department of Health and Human Services, P. H. S., Food and Drug Administration. 1999. Grade "A" Pasteurized Milk Ordinance. Vol. Publication No. 229. 1999 Revision ed. U.S. Department of Health and Human Services, Public Health Service, Food and Drug Administration, Washington.

Wolfe, S. K. 1980. Use of carbon monoxide and carbon dioxide enriched atmospheres for meats, fish and produce. Food Technol. 34:55.

All publication, patent, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A method of extending the useful life a liquid dairy product comprising the steps of:
   (a) filling a bulk container of at least 5000 liter capacity with liquid dairy product mixed with $CO_2$;
   (b) maintaining the liquid dairy product mixed with $CO_2$ in the bulk container for transportation or storage;
   (c) removing the $CO_2$ from the liquid dairy product utilizing a vacuum or negative pressure;
   such that the liquid dairy product does not sustain undesirable biological changes.

2. The method of claim 1 wherein the liquid dairy product is selected from the group of raw milk, whole milk, pasteurized milk, nonfat milk, reduced fat content milk, and filtered, concentrated or evaporated forms thereof.

3. The method of claim 1 wherein the bulk container is a thermally insulated pressure vessel with an R-value of at least 27.5.

4. The method of claim 1 wherein the bulk container is an on-farm storage tank at a dairy farm.

5. The method of claim 1 wherein the bulk container is a transport tank.

6. The method of claim 1 wherein the bulk container is a pressure vessel in the form of an intermodal tank suitable for transport by at least one of the group of rail and cargo ship.

7. The method of claim 1 wherein the liquid dairy product includes at least one of the group consisting of milk fat, milk protein, and whey.

8. The method of claim 1 wherein the bulk container is a pressure vessel and a $CO_2$ head pressure of at least 68 kPa is maintained in the pressure vessel.

9. The method of claim 1 wherein the liquid dairy product is raw milk and wherein the $CO_2$ is mixed with the raw milk to achieve a $CO_2$ concentration between about 1750 and 2250 parts per million.

10. The method of claim 1 wherein the liquid dairy product is raw milk and the bulk container is a pressure vessel in which a $CO_2$ head pressure of between about 138 kPa and 350 kPa is applied and maintained.

11. The method of claim 1 wherein the liquid dairy product is raw milk and when $CO_2$ is removed after four days in the bulk container the Standard Plate Count of the raw milk does is not increased.

12. The method of claim 1 wherein the liquid dairy product is raw milk and wherein the $CO_2$ is mixed with the raw milk to achieve a $CO_2$ concentration between about 200 and 2400 parts per million.

13. The method of claim 8 wherein the liquid dairy product is raw milk and when $CO_2$ is removed after four days in the pressure vessel, the Standard Plate Count of the raw milk is not increased by more than 1 $\log_{10}$ cfu/ml.

14. The method of claim 8 wherein the liquid dairy product is raw milk and when $CO_2$ is removed after seven days in the pressure vessel, the Standard Plate Count of the raw milk is not increased by more than 1 $\log_{10}$ cfu/ml.

15. The method of claim 8 wherein the liquid dairy product is raw milk and when $CO_2$ is removed after four days in the pressure vessel, the counts of thermoduric bacteria, psychotrophic bacteria and E. coli and coliform are not increased by more than 1 $\log_{10}$ cfu/ml.

16. The method of claim 1 wherein the bulk container is a storage tank at a bulk receiving station.

17. The method of claim 1 wherein the $CO_2$ is removed from the liquid dairy product using an agitation process.

18. The method of claim 15 wherein the pressure vessel is an intermodal tank.

19. A process to inhibit the growth of microorganisms in a liquid dairy product during transportation or storage before final processing comprising:
   (a) adding carbon dioxide ($CO_2$) to the liquid dairy product;
   (b) placing the $CO_2$ enhanced liquid dairy product in a pressure vessel subject to $CO_2$ head pressure sufficient to inhibit growth of microorganisms without subjecting the liquid to undesirable biological changes;
   (c) releasing the $CO_2$ from the liquid dairy product;
   (d) processing the liquid dairy product; and
   (e) packaging the processed product for distribution.

20. The process of claim 19 wherein the liquid dairy product is raw milk.

21. The process of claim 19 wherein the processing of the liquid dairy product after releasing the $CO_2$ comprises one or more of the processes selected from the group of pasteurization, homogenization, condensing, culturing and evaporation.

22. The method of claim 19 wherein the liquid dairy product is raw milk and wherein the $CO_2$ is mixed with the raw milk to achieve a $CO_2$ concentration between about 1750 and 2250 parts per million.

23. The method of claim 19 wherein the liquid dairy product is raw milk and a $CO_2$ head pressure of between about 138 kPa and 350 kPa is applied and maintained in the pressure vessel.

24. The method of claim 21 wherein the $CO_2$ is mixed with the liquid dairy product and maintained at a pressure and temperature so that the resulting pH of the liquid dairy product is no greater than 6.

25. A method of transporting and extending the useful life of raw milk comprising the steps of:
- (a) filling a pressure vessel of at least 5000 liter capacity at a first location with raw milk mixed with $CO_2$ at a first location to achieve a $CO_2$ concentration between about 200 and 2400 parts per million;
- (b) maintaining the raw milk mixed with $CO_2$ in the pressure vessel at a $CO_2$ head pressure of at least 68 kPa during transportation by rail or ship to a second location;
- (c) removing the $CO_2$ from the raw milk using a process comprising at least one of agitation, vacuum or negative pressure, all such that the raw milk product does not sustain undesirable biological changes;
- (d) processing the raw milk and packaging the processed product.

* * * * *